(12) United States Patent
Mow et al.

(10) Patent No.: US 9,893,755 B2
(45) Date of Patent: *Feb. 13, 2018

(54) TUNABLE ANTENNA SYSTEMS

(71) Applicant: Apple Inc., Cupertino, CA (US)

(72) Inventors: Matthew A. Mow, Los Altos, CA (US); Robert W. Schlub, Cupertino, CA (US); Mattia Pascolini, San Francisco, CA (US); Robert J. Hill, Salinas, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 300 days.

This patent is subject to a terminal disclaimer.

(21) Appl. No.: 14/737,394

(22) Filed: Jun. 11, 2015

(65) Prior Publication Data

US 2015/0280771 A1 Oct. 1, 2015

Related U.S. Application Data

(63) Continuation of application No. 12/831,180, filed on Jul. 6, 2010, now Pat. No. 9,070,969.

(51) Int. Cl.
*H01Q 9/00* (2006.01)
*H04B 1/40* (2015.01)
(Continued)

(52) U.S. Cl.
CPC ............. *H04B 1/40* (2013.01); *H01Q 1/243* (2013.01); *H01Q 1/48* (2013.01); *H01Q 7/005* (2013.01);
(Continued)

(58) Field of Classification Search
CPC .......... H04B 1/40; H01Q 13/103; H01Q 1/48; H01Q 9/0442; H01Q 1/243; H01Q 9/145; H01Q 7/005; H01Q 9/0421
(Continued)

(56) References Cited

U.S. PATENT DOCUMENTS 2,324,462 A 7/1943 Leeds et al.
4,342,999 A * 8/1982 Woodward ............... H01Q 1/24
343/702
(Continued)

FOREIGN PATENT DOCUMENTS

CN 1764077 4/2006
DE 20314836 11/2003
(Continued)

OTHER PUBLICATIONS

Pascolini et al., U.S. Appl. No. 12/630,756, filed Dec. 3, 2009.
(Continued)

*Primary Examiner* — Jean B Jeanglaude
(74) *Attorney, Agent, or Firm* — Treyz Law Group, P.C.; G. Victor Treyz; Michael H. Lyons

(57) ABSTRACT

An electronic device has wireless communications circuitry including an adjustable antenna system coupled to a radio-frequency transceiver. The adjustable antenna system may include one or more adjustable electrical components that are controlled by storage and processing circuitry in the electronic device. The adjustable electrical components may include switches and components that can be adjusted between numerous different states. The adjustable electrical components may be coupled between antenna system components such as transmission line elements, matching network elements, antenna elements and antenna feeds. By adjusting the adjustable electrical components, the storage and processing circuitry can tune the adjustable antenna system to ensure that the adjustable antenna system covers communications bands of interest.

19 Claims, 21 Drawing Sheets

(51) Int. Cl.
*H01Q 1/24* (2006.01)
*H01Q 1/48* (2006.01)
*H01Q 7/00* (2006.01)
*H01Q 9/04* (2006.01)
*H01Q 9/14* (2006.01)
*H01Q 13/10* (2006.01)

(52) U.S. Cl.
CPC ......... *H01Q 9/0421* (2013.01); *H01Q 9/0442* (2013.01); *H01Q 9/145* (2013.01); *H01Q 13/103* (2013.01)

(58) Field of Classification Search
USPC ....... 343/816, 702, 741, 743–748, 823, 861; 455/575.7, 193.1, 193.2, 193.3
See application file for complete search history.

(56) References Cited

U.S. PATENT DOCUMENTS

| | | | |
|---|---|---|---|
| 4,349,840 | A | 9/1982 | Henderson |
| 4,380,011 | A | 4/1983 | Torres et al. |
| 4,518,965 | A | 5/1985 | Hidaka |
| 4,617,571 | A | 10/1986 | Choquer et al. |
| 4,625,212 | A | 11/1986 | Oda et al. |
| 5,023,621 | A | 6/1991 | Ushiyama et al. |
| 5,048,118 | A | 9/1991 | Brooks et al. |
| 5,381,387 | A | 1/1995 | Blonder et al. |
| 5,465,098 | A | 7/1995 | Fujisawa et al. |
| 5,627,552 | A | 5/1997 | Farrar et al. |
| 5,812,066 | A | 9/1998 | Terk et al. |
| 6,014,113 | A | 1/2000 | Orchard et al. |
| 6,171,138 | B1 | 1/2001 | Lefebvre et al. |
| 6,606,063 | B1 | 8/2003 | Merenda |
| 6,812,898 | B2 | 11/2004 | Doub et al. |
| 7,084,814 | B2 | 8/2006 | Chen et al. |
| 7,132,987 | B1 | 11/2006 | Olsson et al. |
| 7,167,090 | B1 | 1/2007 | Mandal et al. |
| 7,215,283 | B2 | 5/2007 | Boyle |
| 7,250,910 | B2 | 7/2007 | Yoshikawa et al. |
| 7,260,424 | B2 | 8/2007 | Schmidt |
| 7,348,928 | B2 | 3/2008 | Ma et al. |
| 7,408,517 | B1 | 8/2008 | Poilasne et al. |
| 7,612,725 | B2 | 11/2009 | Hill et al. |
| 7,619,574 | B1 | 11/2009 | West |
| 7,671,693 | B2 | 3/2010 | Brobston et al. |
| 7,671,804 | B2 | 3/2010 | Zhang et al. |
| 7,876,274 | B2 | 1/2011 | Hobson et al. |
| 8,204,446 | B2 | 6/2012 | Scheer et al. |
| 8,227,700 | B2 | 7/2012 | Kim |
| 8,421,702 | B2 | 4/2013 | Desclos et al. |
| 2003/0117900 | A1 | 6/2003 | Fujisawa et al. |
| 2004/0041734 | A1 | 3/2004 | Shiotsu et al. |
| 2004/0056808 | A1 | 3/2004 | Jenwatanavet |
| 2004/0227678 | A1 | 11/2004 | Sievenpiper |
| 2006/0055606 | A1 | 3/2006 | Boyle |
| 2006/0097941 | A1 | 5/2006 | Bettren et al. |
| 2007/0146218 | A1 | 6/2007 | Turner et al. |
| 2007/0149145 | A1 | 6/2007 | Chang et al. |
| 2007/0200766 | A1 | 8/2007 | McKinzie et al. |
| 2007/0222697 | A1 | 9/2007 | Caimi et al. |
| 2007/0224948 | A1 | 9/2007 | Hartenstein et al. |
| 2007/0229376 | A1 | 10/2007 | Desclos et al. |
| 2008/0081581 | A1 | 4/2008 | Rofougaran |
| 2008/0100514 | A1 | 5/2008 | Abdul-Gaffoor et al. |
| 2008/0128428 | A1 | 6/2008 | Beckerman |
| 2008/0150811 | A1 | 6/2008 | Honda |
| 2008/0218291 | A1 | 9/2008 | Zhu et al. |
| 2008/0266199 | A1 | 10/2008 | Milosavljevic et al. |
| 2008/0316115 | A1 | 12/2008 | Hill et al. |
| 2009/0081963 | A1 | 3/2009 | Boren |
| 2009/0153412 | A1 | 6/2009 | Chiang et al. |
| 2009/0180403 | A1 | 7/2009 | Tudosoiu |
| 2009/0185325 | A1 | 7/2009 | Park et al. |
| 2009/0256758 | A1 | 10/2009 | Schlub et al. |
| 2009/0256759 | A1 | 10/2009 | Hill et al. |
| 2010/0022203 | A1 | 1/2010 | Bonnet et al. |
| 2010/0053002 | A1 | 3/2010 | Wojack et al. |
| 2010/0060421 | A1 | 3/2010 | Chang et al. |
| 2010/0060529 | A1 | 3/2010 | Schlub et al. |
| 2010/0214180 | A1 | 8/2010 | Krogerus |
| 2010/0231481 | A1 | 9/2010 | Chiang et al. |
| 2010/0271271 | A1 | 10/2010 | Wu |
| 2011/0006953 | A1 | 1/2011 | Chiang et al. |
| 2011/0063779 | A1 | 3/2011 | Ochi et al. |
| 2011/0136447 | A1 | 6/2011 | Pascolini et al. |
| 2012/0162033 | A1 | 6/2012 | Togashi |

FOREIGN PATENT DOCUMENTS

| | | |
|---|---|---|
| DE | 10353104 | 6/2005 |
| EP | 0741433 | 11/1996 |
| EP | 1753082 | 4/2005 |
| EP | 1553658 | 7/2005 |
| EP | 1557903 | 7/2005 |
| EP | 1594188 | 11/2005 |
| EP | 1 686 651 A2 | 8/2006 |
| EP | 2161785 | 3/2010 |
| EP | 2405534 | 1/2012 |
| GB | 921950 | 3/1963 |
| GB | 0944039 | 12/1963 |
| GB | 2384367 | 7/2003 |
| JP | 09-093029 | 4/1997 |
| JP | 09-307344 | 11/1997 |
| JP | 2001136019 | 5/2001 |
| JP | 2006180077 | 7/2006 |
| JP | 2009049455 | 3/2009 |
| JP | 2010147636 | 7/2010 |
| JP | 2010536246 | 11/2010 |
| KR | 1086000331 | 4/1986 |
| KR | 2004108759 | 12/2004 |
| KR | 1020080052676 | 6/2008 |
| WO | 198905530 | 6/1989 |
| WO | 2008010149 | 1/2008 |
| WO | 2009002575 | 12/2008 |
| WO | 2009091323 | 7/2009 |
| WO | 2012006152 | 1/2012 |

OTHER PUBLICATIONS

Jarvis et al., U.S. Appl. No. 12/823,929, filed Jun. 25, 2010.
Caballero, et al., U.S. Appl. No. 12/941,010, filed Nov. 5, 2010.
Lee et al. "A Compact and Low-Profile Tunable Loop Antenna Integrated With Inductors", IEEE Antennas and Wireless Propagation Letters, vol. 7, 2008 pp. 621-624.
Nanbo Jin et al., U.S. Appl. No. 13/041,905, filed Mar. 7, 2011.
Menzel et al., "A Microstrip Patch Antenna with Coplanar Feed Line" IEEE Microwave and Guided Wave Letters, vol. 1, No. 11, Nov. 1991, pp. 340-342.
Terada et al., "Circularly Polarized Tunable Microstrip Patch Antenna Using an Adjustable Air Gap", Proceedings of ISAP2005, Seoul, Korea pp. 977-980.
Schlub et al., U.S. Appl. No. 12/759,243, filed Apr. 13, 2010.
Chiang et al., U.S. Appl. No. 12/401,599, filed Mar. 10, 2009.
Nickel et al., U.S. Appl. No. 12/752,966, filed Apr. 1, 2010.

* cited by examiner

TUNABLE ANTENNA SYSTEMS

This application is a continuation of patent application Ser. No. 12/831,180, filed Jul. 6, 2010, which is hereby incorporated by reference herein in its entirety. This application claims the benefit of and claims priority to patent application Ser. No. 12/831,180, filed Jul. 6, 2010.

BACKGROUND

This relates generally to wireless communications circuitry, and more particularly, to electronic devices that have tunable antenna systems.

Electronic devices such as computers and handheld electronic devices are often provided with wireless communications capabilities. For example, electronic devices may use long-range wireless communications circuitry such as cellular telephone circuitry to communicate using cellular telephone bands. Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz.

To satisfy consumer demand for small form factor wireless devices, manufacturers are continually striving to implement wireless communications circuitry such as antenna components using compact structures. However, it can be difficult to fit conventional antenna structures into small devices. For example, antennas that are confined to small volumes often exhibit narrower operating bandwidths than antennas that are implemented in larger volumes. If the bandwidth of an antenna becomes too small, the antenna will not be able to cover all communications bands of interest.

In view of these considerations, it would be desirable to provide improved wireless circuitry for electronic devices.

SUMMARY

An electronic device may be provided with wireless communications circuitry including an adjustable antenna system coupled to a radio-frequency transceiver. The adjustable antenna system may include one or more adjustable electrical components that are controlled by storage and processing circuitry in the electronic device. By adjusting the adjustable electrical components, the storage and processing circuitry can tune the adjustable antenna system to ensure that the adjustable antenna system satisfactorily covers communications bands of interest.

The adjustable electrical components may include switches that can be placed in open or closed positions. The adjustable electrical components may also include components that can be continuously or semicontinuously adjusted to produce various resistances, capacitances, and inductances. Antenna system adjustments may be made to transmission line structures, matching networks, antenna resonating elements, antenna grounds, and antenna feeds.

An antenna may have portions that are formed from conductive electronic device housings. An electronic device may have a rectangular periphery. A conductive peripheral member such as a display bezel or housing sidewall member may surround the periphery of the housing. One or more dielectric gaps may be interposed in the conductive peripheral member. The adjustable electrical components may be used to bridge the gaps. Control signals may be applied to the adjustable electrical components to adjust the size of the gap and other antenna system parameters and thereby tune the antenna system.

Further features of the invention, its nature and various advantages will be more apparent from the accompanying drawings and the following detailed description of the preferred embodiments.

DETAILED DESCRIPTION

Figure 1:
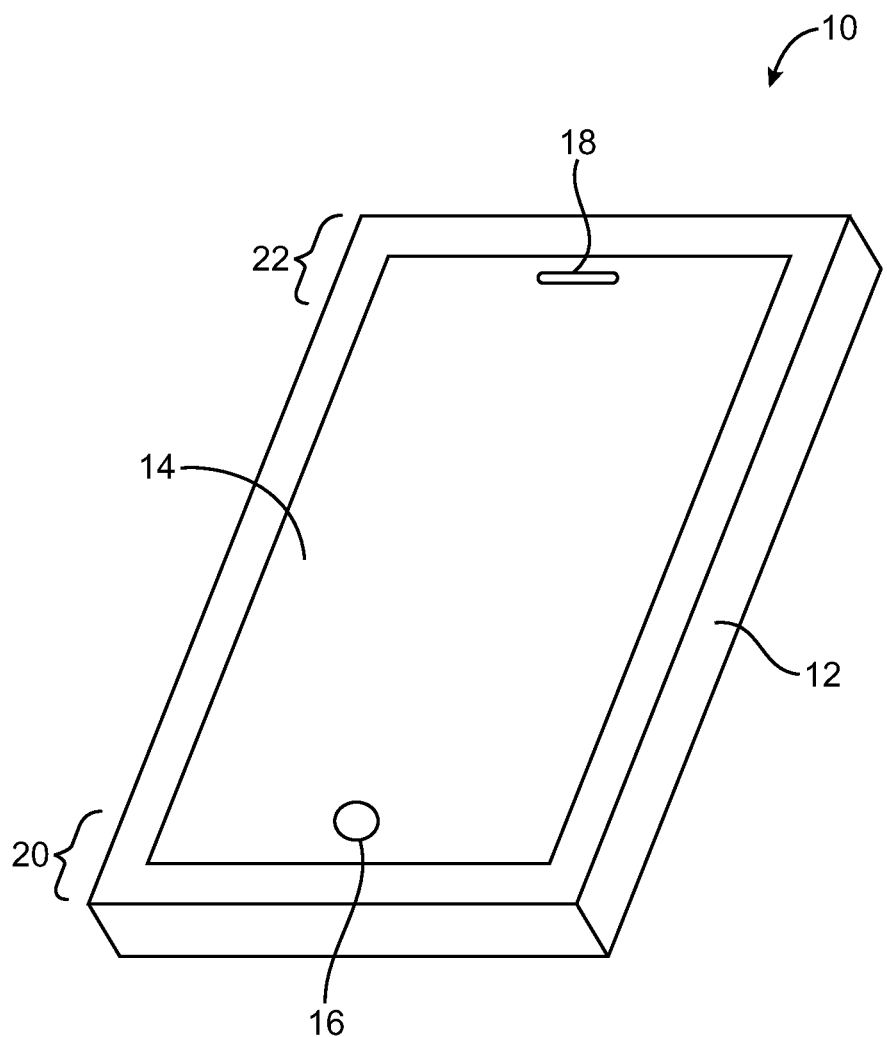
FIG. 1 is a perspective view of an illustrative electronic device with wireless communications circuitry in accordance with an embodiment of the present invention.

Electronic devices such as device 10 of FIG. 1 may be provided with wireless communications circuitry. The wireless communications circuitry may be used to support wireless communications such as long-range wireless communications (e.g., communications in cellular telephone bands) and short-range communications (i.e., local area network links such as WiFi® links, Bluetooth® links, etc.). The wireless communications circuitry may include one or more antennas. The antennas and associated wireless communications circuits within the electronic devices may be adjustable. Adjustable antenna systems may be tuned to adjust antenna response within a band (i.e., the antenna systems may be fine tuned). Fine tuning may be used to ensure that signals in a desired communications band are received properly. Adjustable antenna systems may also be tuned so that an antenna response curve that would otherwise only cover a single band or group of bands can be used to cover additional frequencies of interests (i.e., the antenna systems may be coarsely tuned to cover a different band or group of bands). Coarse tuning may allow relatively narrow bandwidth antennas to be tuned to cover communications bands over a relatively wide range of frequencies.

Any suitable electronic devices (e.g., device 10 of FIG. 1) may be provided with adjustable antenna systems that have these types of fine and coarse tuning capabilities. For example, adjustable antenna systems may be used in electronic devices such as desktop computers, game consoles, routers, laptop computers, computers embedded in a computer monitor or television, computers that are part of set-top boxes or other consumer electronics equipment, relatively compact electronic devices such as portable electronic devices, etc. The use of portable electronic devices is sometimes described herein as an example. This is, however, merely illustrative. Adjustable antenna systems may be used in any electronic device.

Electronic devices such as illustrative electronic device 10 of FIG. 1 may be laptop computers, tablet computers, cellular telephones, media players, other handheld and portable electronic devices, smaller devices such as wrist-watch devices, pendant devices, headphone and earpiece devices, other wearable and miniature devices, or other electronic equipment.

As shown in FIG. 1, device 10 includes housing 12. Housing 12, which is sometimes referred to as a case, may be formed of materials such as plastic, glass, ceramics, carbon-fiber composites and other composites, metal, other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electronic ink elements, liquid crystal display (LCD) components, or other suitable image pixel structures. A cover glass member may cover the surface of display 14. Buttons such as button 16 may pass through openings in the cover glass. Openings may also be formed in the cover glass of display 14 to form a speaker port such as speaker port 18. Openings in housing 12 may be used to form input-output ports, microphone ports, speaker ports, button openings, etc.

Wireless communications circuitry in device 10 may be used to form remote and local wireless links. One or more antennas may be used during wireless communications. Single band and multiband antennas may be used. For example, a single band antenna may be used to handle Bluetooth® communications at 2.4 GHz (as an example). As another example, a multiband antenna may be used to handle cellular telephone communications in multiple cellular telephone bands. Other types of communications links may also be supported using single-band and multiband antennas.

If desired, device 10 may use multiple antennas. Multiple antennas may, for example, be used to support an antenna diversity scheme. With an antenna diversity scheme, control circuitry in device 10 may monitor signal quality or sensor data to determine which antenna or antennas are performing best or are otherwise desirable to use (e.g., to satisfy regulatory limits). Based on these considerations, the control circuitry may then choose to use only a subset of the antennas or may otherwise adjust antenna use. If, for example, a sensor or a signal quality measurement determines that one of two antennas in an antenna diversity arrangement has become blocked by an external object such as part of a human body, the control circuitry may temporarily inactivate that antenna.

Device 10 may also use multiple antennas to implement a multiple-input-multiple-output (MIMO) communications protocol. In a MIMO scheme, each of the antennas in a system may handle an independent data stream, allowing overall data throughput to be increased. The control circuitry in device 10 may use proximity data or other data to control operation of the multiple antennas in the MIMO setup. For example, the control circuitry may temporarily switch from MIMO operation to a protocol that uses only a single antenna or may switch from a four-antenna MIMO scheme to a two-antenna MIMO scheme, etc.

Antennas may be located at any suitable locations in device 10. For example, one antenna may be located in an upper region such as region 22 and another antenna may be located in a lower region such as region 20. In a larger device, antennas may be located along device edges, in the center of a rear planar housing portion, in device corners, etc.

Antennas in device 10 may be used to support any communications bands of interest. For example, device 10 may include antenna structures for supporting local area network communications (e.g., IEEE 802.11 communications at 2.4 GHz and 5 GHz for wireless local area networks), signals at 2.4 GHz such as Bluetooth® signals, voice and data cellular telephone communications (e.g., cellular signals in bands at frequencies such as 850 MHz, 900 MHz, 1800 MHz, 1900 MHz, 2100 MHz, etc.), global positioning system (GPS) communications at 1575 MHz, signals at 60 GHz (e.g., for short-range links), etc.

Different antennas may handle different bands or a communications band or group of bands may be handled using a shared antenna. One antenna in device 10 may, for example, be used in handling voice and data communications in one or more cellular telephone bands, whereas another antenna in device 10 may provide coverage in a first band for handling Global Positioning System (GPS) signals at 1575 MHz and a second band for handling Bluetooth® and IEEE 802.11 (wireless local area network) signals at 2.4 GHz (as examples). Additional antennas may be provided to implement antenna diversity schemes, phased antenna arrays (e.g., at 60 GHz), additional bands, etc.

Figure 2:
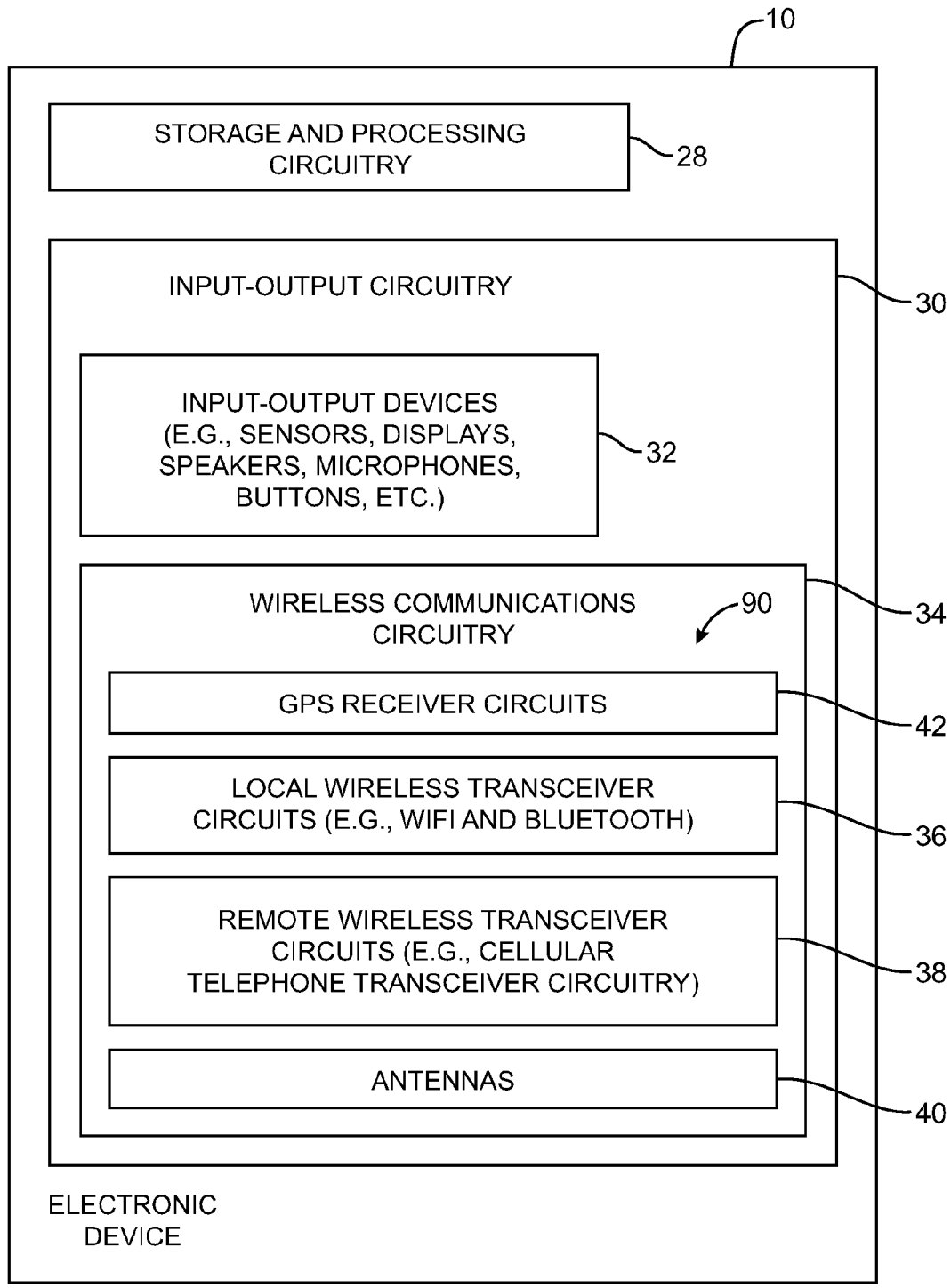
FIG. 2 is a schematic diagram of an illustrative electronic device with wireless communications circuitry in accordance with an embodiment of the present invention.

A schematic diagram showing illustrative components that may be used in device 10 of FIG. 1 is shown in FIG. 2. As shown in FIG. 2, device 10 may include storage and processing circuitry 28. Storage and processing circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc. Antenna system tuning operations may be controlled using software stored and running on device 10 (i.e., stored and running on storage and processing circuitry 28 and/or input-output circuitry 30).

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands at 850 MHz, 900 MHz, 1800 MHz, 1900 MHz, and 2100 MHz data band (as examples). Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, etc.

Wireless communications circuitry 34 may include global positioning system (GPS) receiver equipment such as GPS receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structure, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

With one suitable arrangement, device 10 may have antennas in regions of device 10 such as upper region 22 and lower region 20. One or more upper antennas for device 10 may be formed in region 22. One or more lower antennas for device 10 may be formed in region 20. In devices with other form factors such as laptop and tablet computers, wearable devices, computer monitors with integrated computers, etc., antennas may be located in other suitable regions (e.g., at the four corners of a rectangular device, on front and back surfaces, along edge regions of a device, in one or more arrays, etc.).

Figure 3:
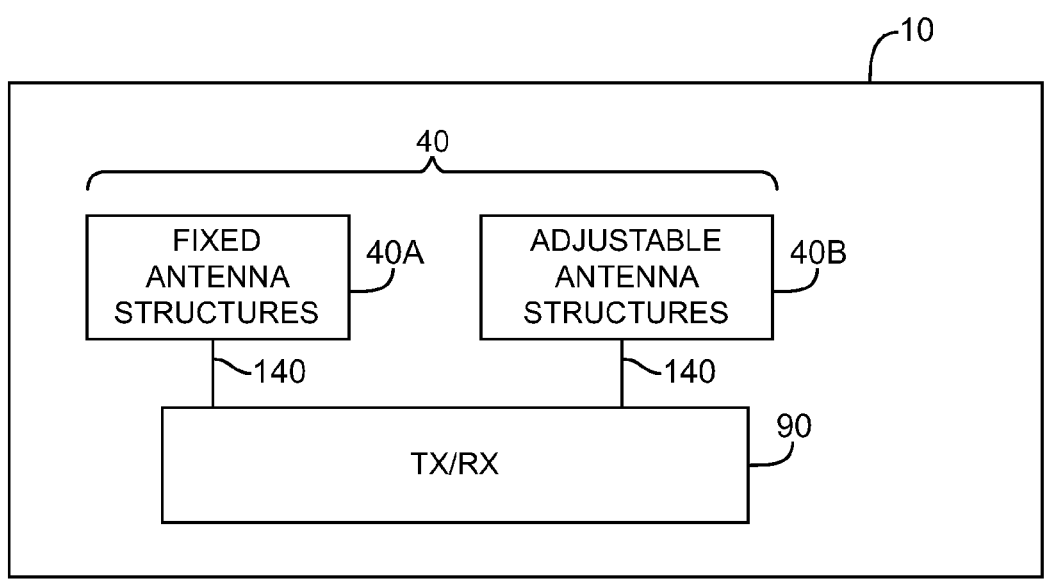
FIG. 3 is circuit diagram of illustrative wireless communications circuitry having fixed and adjustable antenna structures in an electronic device in accordance with an embodiment of the present invention.

As shown in FIG. 3, transceiver circuitry 90 may be coupled to antennas 40 using transmission lines 140. Device 10 may have antennas 40 that include both fixed antenna structures (e.g., fixed antenna structures 40A) and adjustable antenna structures (e.g., adjustable antenna structures 40B). A configuration that includes both fixed and adjustable antennas may be used, for example, when there is sufficient space available for only one broadband antenna. In this type of arrangement, fixed antenna structures 40A may use a broadband design that covers multiple communications bands, whereas adjustable structures 40B may use a narrowband design that achieves multiband coverage through use of coarse antenna system tuning. Other configurations may also be used. For example, device 10 may be provided exclusively with adjustable antenna structures. In general, any suitable number of adjustable antennas may be provided in device 10 (e.g., one adjustable antenna, two adjustable antennas, three adjustable antennas, four or more adjustable antennas, etc.).

When device 10 includes an adjustable antenna system (i.e., when antennas 40 and associated wireless circuitry 34 in device 10 is adjustable), antenna performance can be altered in real time. For example, the resonance curve of the antenna system may be slightly altered to compensate for environmental factors such as temperature changes. Relatively small adjustments to the frequency response of an antenna system are sometimes referred to as fine tuning adjustments or fine tuning. If desired, the frequency response of the antenna system can be adjusted by larger amounts. For example, the frequency response of an antenna may be altered sufficiently to cause the antenna to cover different communications bands.

Figure 4:
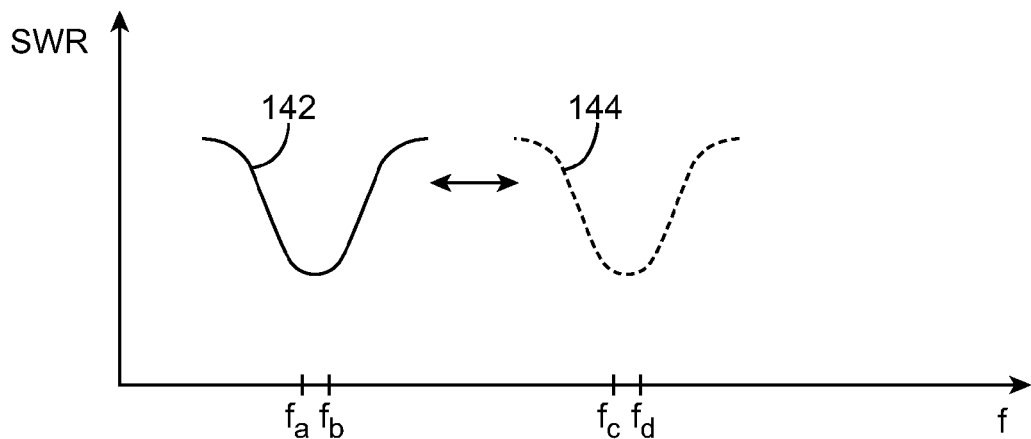
FIG. 4 is a graph showing how antenna structures can be adjusted during operation to cover communications bands of interest in accordance with an embodiment of the present invention.

A standing wave ratio (SWR) versus frequency plot for an illustrative antenna system in device 10 is shown in FIG. 4. In the FIG. 4 example, the antenna system operates in two modes. In a first mode of operation, the antenna system is characterized by a frequency response of the type illustrated by solid line 142. As shown in FIG. 4, this frequency response allows the antenna system to cover two communications bands (i.e., a first communications band centered at frequency $f_a$ and a second communications band centered at frequency $f_b$). In a second mode of operation, the antenna system is characterized by a frequency response of the type illustrated by dashed line 144. When operating in the second mode of operation, the antenna system may cover one communications band at frequency $f_c$ and another communications band at frequency $f_d$. Frequency bands $f_a$ and $f_b$ may be, for example, 850 MHz and 900 MHz frequency bands, whereas frequency bands $f_c$ and $f_d$ may be, for example, 1900 MHz and 2100 MHz frequency bands (as examples). During operation of device 10, device 10 can determine which communications bands are to be used and can adjust the adjustable antenna system accordingly (i.e., to cover the frequency range associated with curve 142 or to cover the frequency range associated with curve 144).

If desired, device 10 may include a fixed antenna such as the fixed antenna of FIG. 3 that covers both low bands ($f_a$ and $f_b$) and high bands ($f_c$ and $f_d$). As described in connection with FIG. 4, device 10 may also have an adjustable antenna system that is adjusted between the first and second modes to selectively cover the same bands that are covered by the fixed antenna.

Figure 5:
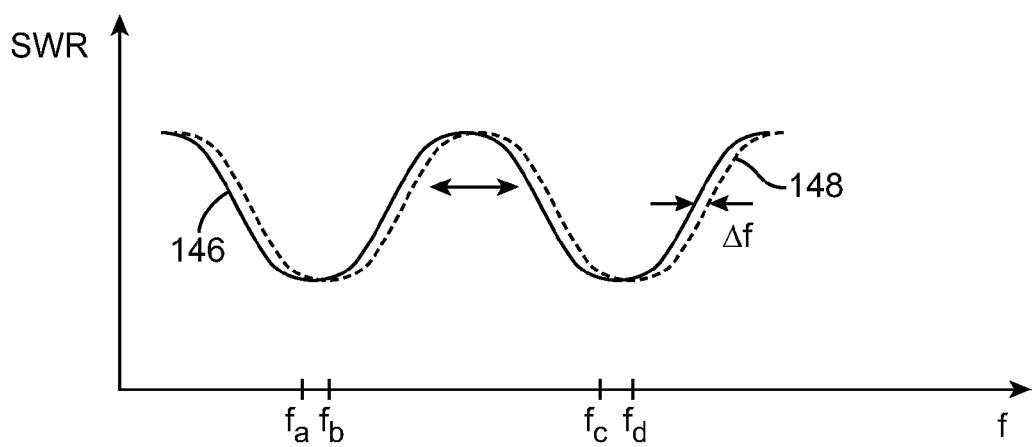
FIG. 5 is a graph showing how antenna structures can be adjusted during operation to fine tune antenna response during operation in accordance with an embodiment of the present invention.

An illustrative fine tuning operation using an adjustable antenna system in device 10 is shown in FIG. 5. As shown in FIG. 5, the adjustable antenna system may initially exhibit a frequency response of the type shown by solid line 146. Due to changes in operating temperature or other effects, the frequency response of the antenna may need to be adjusted to ensure that signals are properly received and transmitted. This can be accomplished by adjusting the adjustable antenna system in device 10 so that its frequency response shifts slightly to the frequency response shown by dashed line 148 (i.e., a frequency shift of $\Delta f$). Real time adjustments such as the fine tuning adjustments of FIG. 5 and the coarse tuning adjustments of FIG. 4 may be made to ensure that device 10 performs as desired under a variety of wireless traffic and environmental scenarios.

Figure 6:
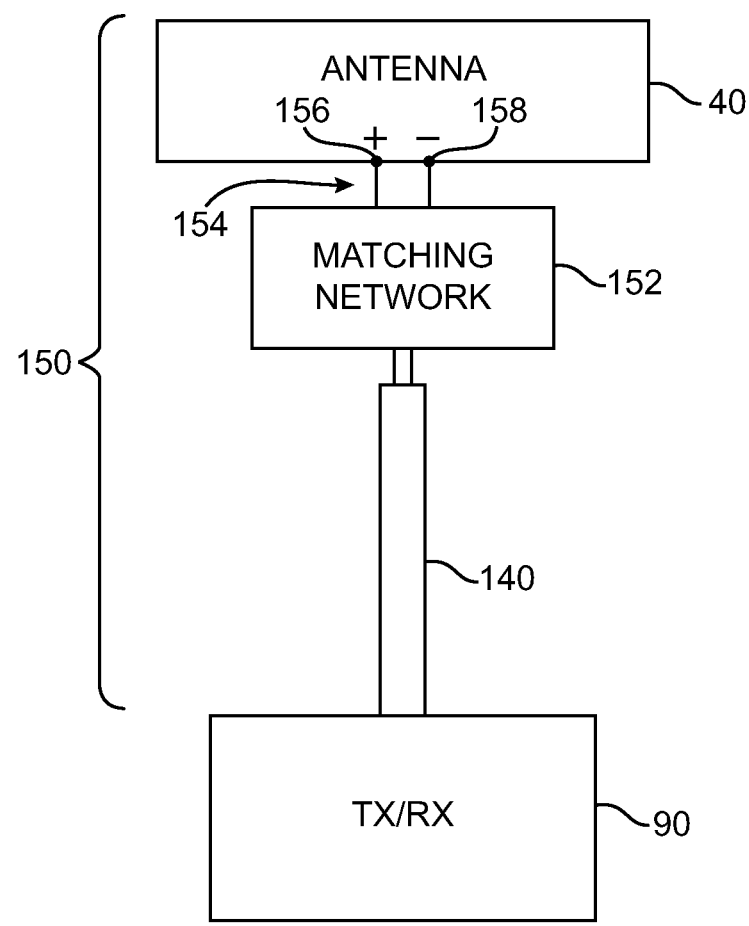
FIG. 6 is a diagram of wireless communications circuitry in an electronic device showing how a transceiver circuit may feed an antenna using a transmission line and a matching network in accordance with an embodiment of the present invention.

FIG. 6 shows illustrative components that may be included in an adjustable antenna system in electronic device 10. As shown in FIG. 6, radio-frequency signals may be generated and received by radio-frequency transceiver circuitry 90. Circuitry 90 may include radio-frequency transmitters for transmitting radio-frequency signals and radio-frequency receivers for receiving radio-frequency signals. Radio-frequency amplifier circuitry and other components (e.g., switches) may be included in transceiver circuit block 90.

Adjustable antenna system 150 may include antennas 40, matching network 152, and transmission line 140.

Antenna 40 may be include antenna ground structures and antenna resonating element structures such as loop antenna structures, patch antenna structures, inverted-F antenna structures, slot antenna structures, planar inverted-F antenna structures, helical antenna structures, hybrids of these designs, etc.

Transmission line 140 may be coupled to transceiver circuitry 90. Transmission line 140 may be based on a microstrip transmission line structure, a stripline transmission line structure, an edge coupled microstrip transmission line structure, an edge coupled stripline transmission line structure, transmission line structures formed on flexible printed circuits ("flex circuits"), structures formed on rigid printed circuit boards, a coaxial cable, other suitable transmission line structures, or combinations of these structures.

Matching network 152 may be used to help match the impedance of transmission line 140 to the impedance of antenna 40. Matching network 152 may include electrical components such as resistors, inductors, and capacitors, and conductive traces, pieces of metal, and other structures that have associated resistances, inductances, and capacitances. Although shown as being interposed between transmission line 140 and antenna 40 in the example of FIG. 6, matching network components may, if desired, be interposed within transmission line 90 and/or within antenna 40. The arrangement of FIG. 6 is merely illustrative.

Antenna 40 may be fed using an antenna feed such as an antenna feed formed from positive antenna feed terminal 156 and ground antenna feed terminal 158.

To provide antenna system 150 with adjustability, antenna system 150 may be provided with one or more adjustable electrical components. These components may be incorporated into antenna 40 (including the antenna feed), matching network 152, and transmission line 140.

Figure 7:
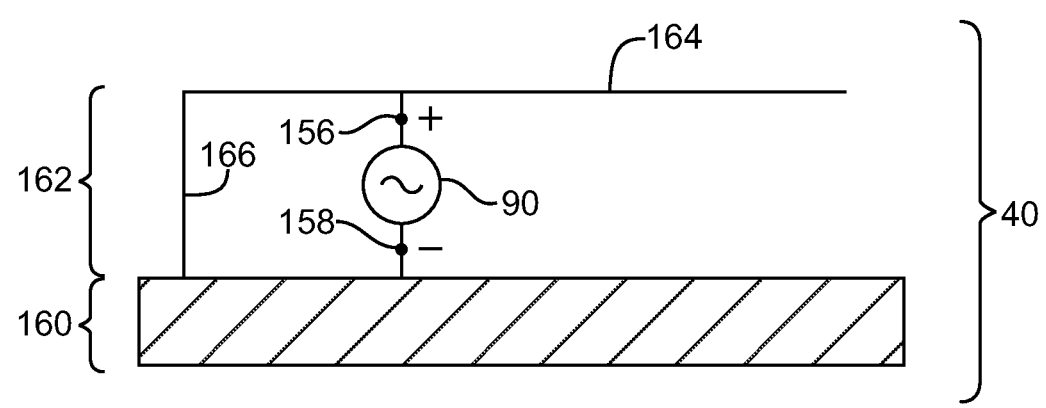
FIG. 7 is a diagram of an illustrative antenna that may be used in wireless communications circuitry in an electronic device in accordance with an embodiment of the present invention.

FIG. 7 is a diagram of an illustrative antenna. In the FIG. 7 example, antenna 40 has an inverted-F configuration. This is, however, merely illustrative. Antenna 40 may be formed using any suitable antenna design.

As shown in FIG. 7, antenna 40 may include an antenna ground (e.g., antenna ground element 160) and an antenna resonating element (antenna resonating element 162).

Antenna ground 160 and antenna resonating element 162 may be formed from conductive structures such as pieces of metal, metal traces on printed circuit boards, parts of an electronic device housing, conductive components, and other conductive elements in device 10. Antenna ground element 160 may be formed from one conductive structure or multiple conductive structures. Antenna resonating element 162 may have a main resonating element branch such as branch 164 and additional branches. Segment 166 of resonating element 162 may short arm 164 to ground 160.

Transceiver 90 may be coupled to antenna feed terminals 156 and 158. Matching network components and transmission line structures are not shown in FIG. 7 to avoid over-complicating the drawing.

Antenna 40 and the other structures of antenna system 150 may be provided with adjustable electrical components such as switches and continuously and semicontinuously tunable electrical components. For example, an adjustable electrical component may be coupled between portions of antenna resonating element arm 164 or between portions of ground plane 160 in an antenna of the type shown in FIG. 4. Adjustable electrical components may also be incorporated into matching network 152 or transmission line 140 of FIG. 6. The antenna feed for antenna 40 may be adjusted using adjustable electrical components (e.g., adjustable electrical components coupled to feed terminals).

Figure 8:
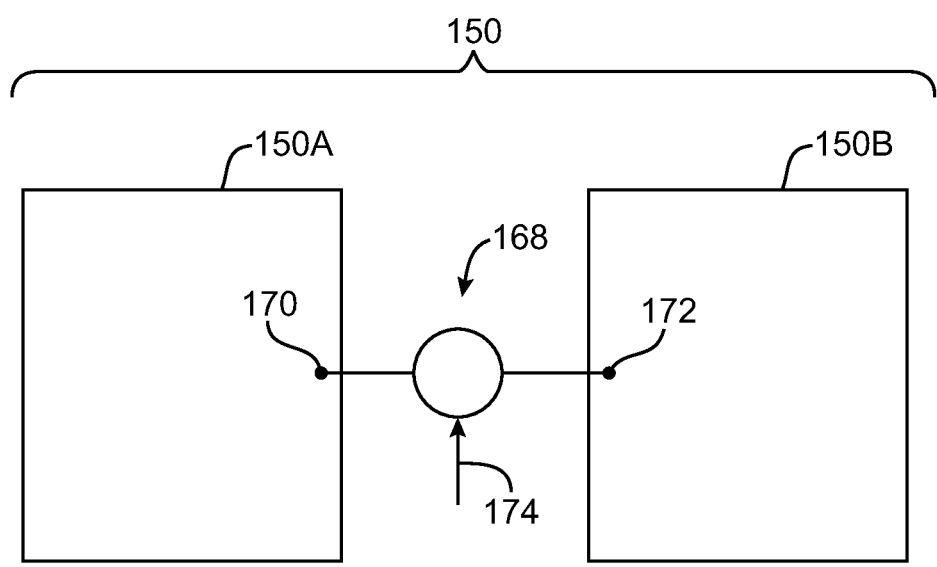
FIG. 8 is a diagram of showing how wireless circuit components such as antenna system structures may be coupled using an adjustable electrical component in accordance with an embodiment of the present invention.

The use of an adjustable electrical component to make adjustments to adjustable antenna system 150 is illustrated in FIG. 8. As shown in FIG. 8, adjustable antenna system 150 may include adjustable antenna system portions 150A and 150B. Portions 150A and 150B may be antenna resonating element structures, antenna ground element structures, parasitic antenna structures (e.g., antenna structures that are near-field coupled to other antenna structures) antenna feed structures, other antenna structures, matching network structures, transmission line structures (e.g., a transmission line stub), other antenna system structures, or any combination of these structures.

Adjustable electrical component 168 may have a first terminal such as terminal 170 that is connected to antenna system portion 150A and a second terminal such as terminal 172 that is connected to antenna system portion 150B. Adjustable electrical component 168 may be adjusted using control signals applied to control input 174 or may be implemented using a two-terminal arrangement in which control signals are applied over terminals 170 and 172. Examples of adjustable electrical components that may be used for adjustable electrical component 168 include switches, variable resistors, variable capacitors, variable inductors, and components that control multiple electrical parameters.

Figure 9:
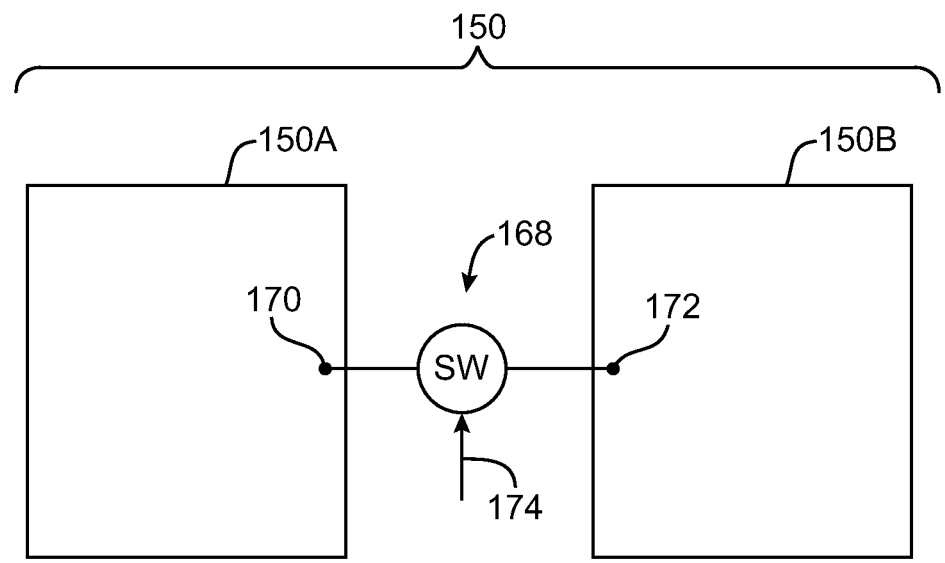
FIG. 9 is a diagram of showing how wireless circuit components such as antenna system structures may be coupled using an adjustable electrical component such as a switch in accordance with an embodiment of the present invention.

FIG. 9 shows how adjustable electrical component 168 may be implemented using a switch. Switch 168 of FIG. 9 may be placed in an open state in which antenna system portion 150A is electrically isolated from antenna system portion 150B or may be placed in a closed state in which terminals 170 and 172 are shorted together so that portions 150A and 150B are electrically connected. Switch 168 may be implemented using a gallium arsenide field-effect transistor (FET), a microelectromechanical systems (MEMs) switch, a metal-oxide-semiconductor field-effect transistor (MOSFET), a p-i-n diode, a high-electron mobility transistor (HEMI), a pseudomorphic HEMI (PHEMT), a transistor formed on a silicon-on-insulator (SOI) substrate, etc.

Figure 10:
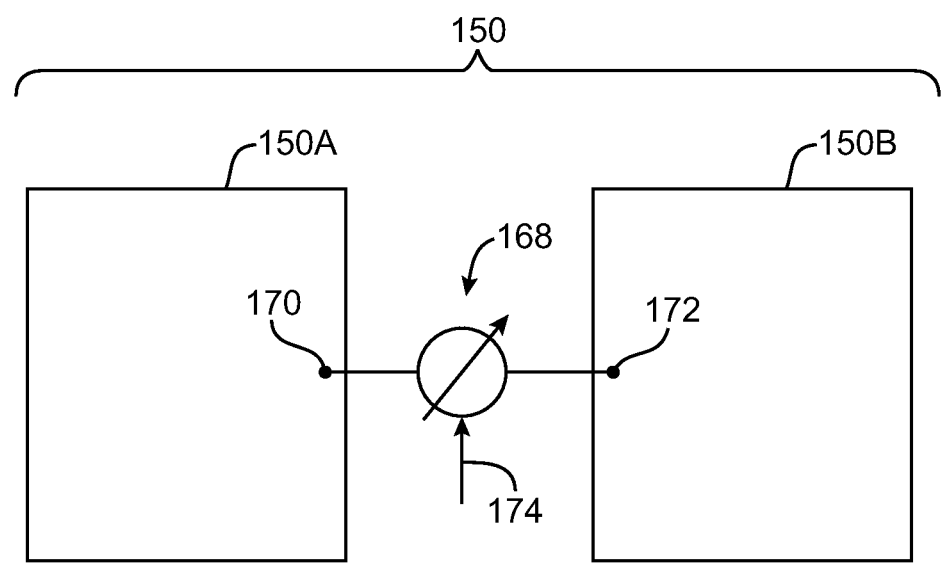
FIG. 10 is a diagram of showing how wireless circuit components such as antenna system structures may be coupled using an adjustable electrical component such as a circuit element with continuously or semicontinuously tunable electrical properties in accordance with an embodiment of the present invention.
Figure 11:
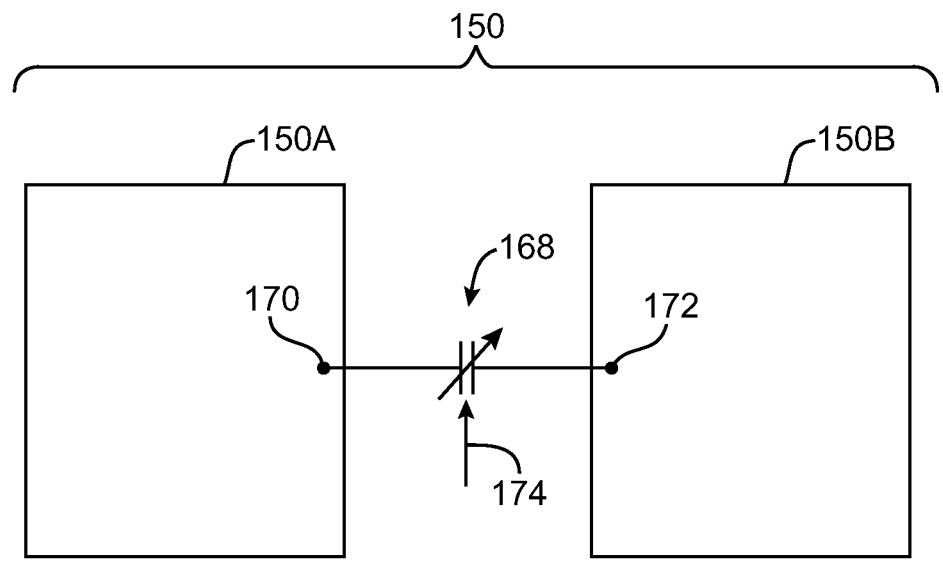
FIG. 11 is a diagram of showing how wireless circuit components such as antenna system structures may be coupled using an adjustable electrical component such as a tunable capacitor with a continuously or semicontinuously tunable capacitance in accordance with an embodiment of the present invention.

As shown in FIG. 10, adjustable electrical component 168 may be implemented using a component that can be placed in numerous different states (e.g., a component that is continuously variable or that is semicontinuously variable and can be placed in one of a number of different discrete states). Component 168 may be, for example, a continuously variable capacitor, a semicontinuously adjustable capacitor that has 2-100 or more different capacitance values, a continuously variable resistor, a semicontinuously adjustable resistor that has 2-100 or more different resistance values, a continuously variable inductor, or a semicontinuously adjustable inductor that has 2-100 or more different inductance values. FIG. 11 shows, for example, how adjustable electrical component 168 may include a continuously variable capacitor. Semicontinuously adjustable components may be implemented using arrays of discrete components and switches configured to serve as multiplexers.

Figure 12:
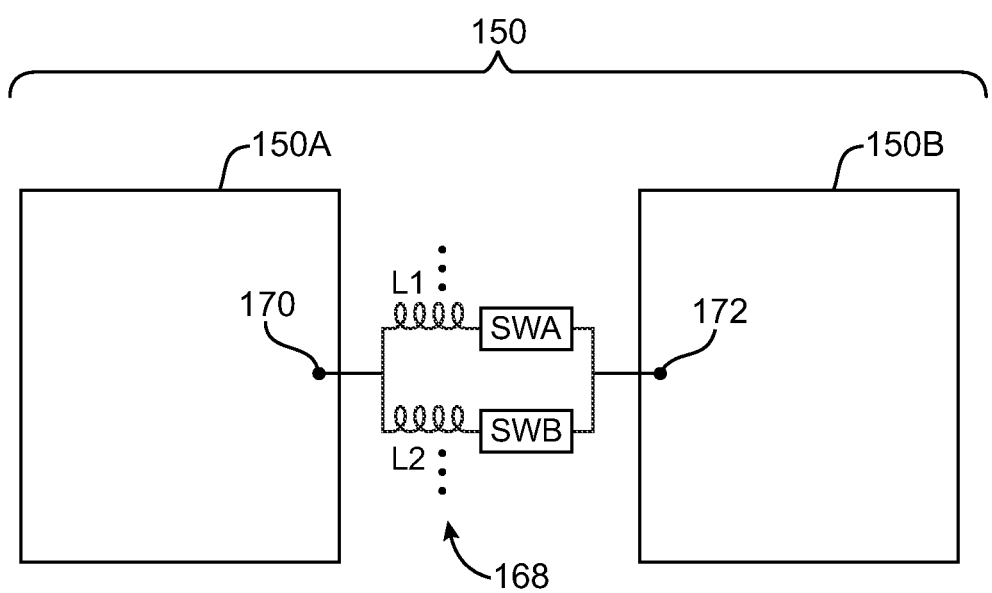
FIG. 12 is a diagram of showing how wireless circuit components such as antenna system structures may be coupled using an adjustable electrical component such as semicontinuously a tunable electrical network with switches that provide the network with multiple selectable impedance values in accordance with an embodiment of the present invention.

If desired, adjustable electrical component 168 may be formed from other adjustable electrical components. As shown in FIG. 12, for example, semicontinuously adjustable electrical component 168 may be formed from an electrical network that includes inductors such as inductors L1 and L2. Switches (e.g., switches SWA and SWB in the FIG. 12 example) may be used to form desired patterns of electrical connections within the electrical network. For example, components may be switched into or out of use or may be interconnected in different ways. In the FIG. 12 example, the inductance that is exhibited between terminals 170 and 172 may be adjusted by opening and closing switches SWA and SWB in various patterns. Networks with other patterns of electrical components (e.g., capacitors, resistors, inductors, and conductive and dielectric structures that have capacitance, inductance, and resistance and that serve as capacitors, resistors, and inductors), other patterns of switches or continuously or semicontinuously adjustable components may also be used in implementing adjustable electrical component 168. The example of FIG. 12 is merely illustrative.

Figure 13:
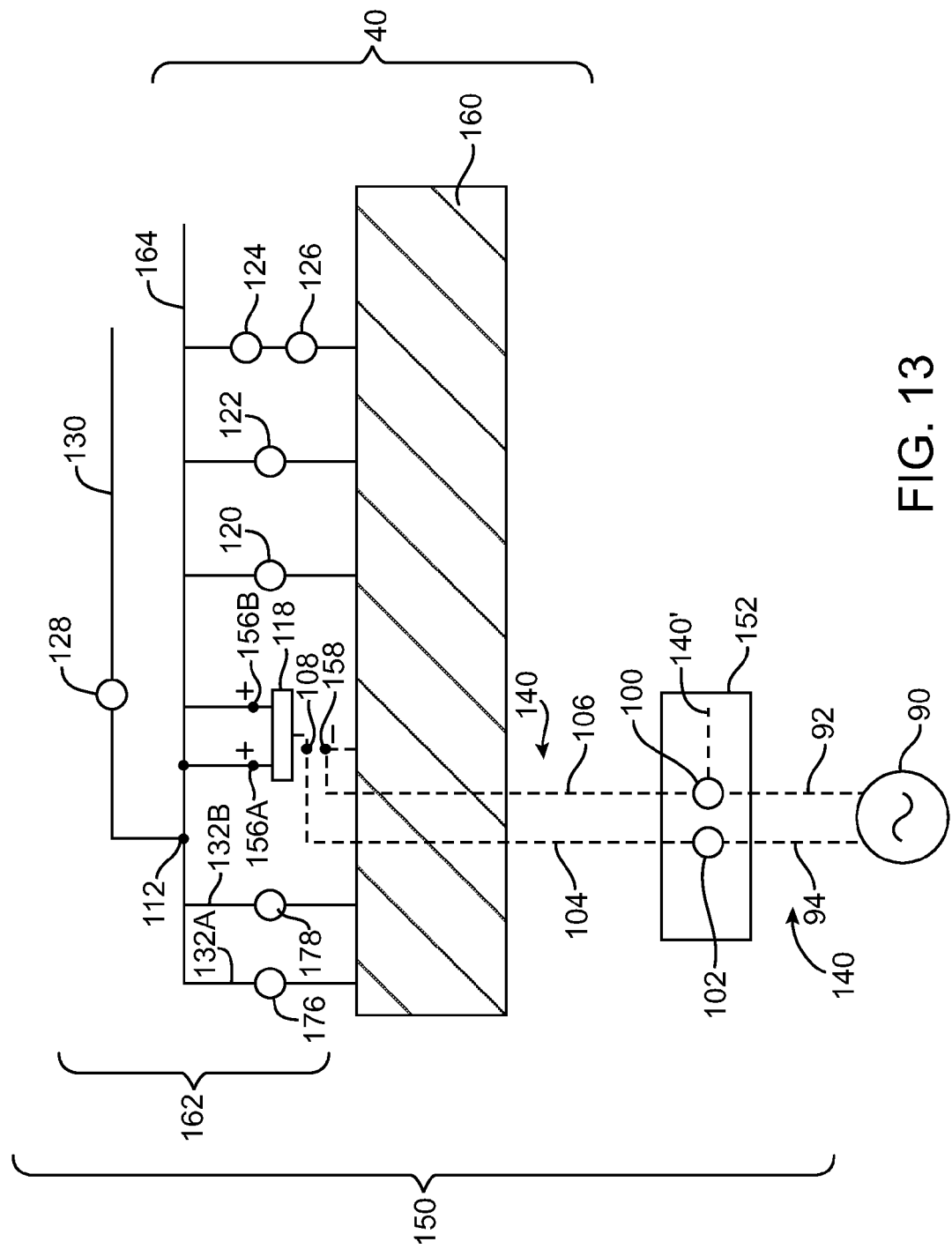
FIG. 13 is a circuit diagram of an adjustable antenna system in an electronic device in accordance with an embodiment of the present invention.

An illustrative adjustable antenna system 150 that is based on an inverted-F antenna such as antenna 40 of FIG. 7 is shown in FIG. 13. Main resonating element arm 164 of antenna 40 may be connected to ground 160 through a short circuit path such as path 132A (if switch 176 is closed and switch 178 is open) or path 132B (if switch 176 is open and switch 178 is closed). A feed path (see, e.g., terminals 158 and 108), and one or more optional paths such as the path formed by adjustable electrical component 120 (e.g., a switch), the path formed by element 122 (e.g., a semicontinuously or continuously adjustable component), and the path formed by adjustable electrical components 124 and 126 (e.g., a switch and a continuously adjustable component, respectively). Optional antenna resonating element branches such as branch 130 may be coupled to antenna 40 (e.g., by connecting branch 130 to main resonating element arm 164 through adjustable electrical component 128).

Antenna 40 may be feed by transceiver 90 (i.e., transceiver circuitry such as transceiver circuitry 90 of FIG. 2). Transmission line 140 may have paths such as positive antenna signal paths 94 and 104 and ground antenna signal paths such as paths 92 and 106 and may be used to convey radio-frequency antenna signals between transceiver 90 and antenna 40.

Matching circuitry 152 may be interposed in the path between transceiver 90 and antenna 40. Matching circuitry 152 may include series-connected and shunt-connected adjustable electrical components such as components 102 and 100. One or more adjustable electrical components such as components 100 and 102 may be coupled between transmission line 140 and additional transmission line components and other electrical components. For example, a component such as a transmission line stub (e.g., transmission line stub 140'), may be coupled to transmission line 140 via component 100. Any of the adjustable electrical components used in adjustable antenna system 150 may include transmission line structures, if desired.

Transmission line paths such as positive transmission line path 104 and ground transmission line path 106 may be used to interconnect matching circuitry 152 to the antenna feed of antenna 40. The antenna feed may have a fixed or tunable configuration. In the example of FIG. 13, the antenna feed for antenna 40 is tunable between a first antenna feed configuration in which switch 118 (or other such adjustable electrical component) has a first position and a second antenna feed configuration in which switch 118 has a second position. When switch 118 is in its first position, terminal 108 is connected to terminal 156A, so that terminal 156A serves as the positive antenna feed terminal for antenna 40. When switch 118 is in its second position, terminal 108 is connected to terminal 156B, so that terminal 156B serves as the positive antenna feed terminal for antenna 40.

Feed terminals 156A and 156B are located at different positions along the length of main resonating element arm 164, so the impedance and therefore the frequency response of antenna 40 can be adjusted by using switch 118 to control the feed location in antenna 40. The arrangement of FIG. 13 is merely illustrative. In general, antennas such as antenna 40 in device 10 may have tunable feeds formed from two or more feed points, tunable feeds that involve one, two, three, or more than three switches, feeds that are tuned by adjusting the ground antenna feed and/or the positive antenna feed, non-tunable feeds, etc.

By incorporating adjustable electronic components into antenna 40 (e.g., antenna resonating element 162), antenna 40 may be adjusted ad described in connection with FIGS. 4 and 5. For example, the size and shape of antenna structures such as resonating element 162 in antenna 40 can be controlled by storage and processing circuitry 28. In the FIG. 13 arrangement, adjustable electrical component 128 may be, for example, a switch with two states (e.g., an open state that electrically disconnects antenna resonating element portion 130 from antenna resonating element portion 164 and a closed state that electrically connects antenna resonating element portion 130 and antenna resonating element portion 164). Component 128 may adjust the size and shape of the antenna resonating element and thereby adjust the frequency response of the antenna as described in connection with FIGS. 4 and 5. Additional resonating element structures and antenna structures may likewise be selectively connected and disconnected from the antenna resonating element in antenna 40 if desired. Circuit components (e.g., resistors, inductors, and capacitors) may be interconnected with switches such as switch 128 (e.g., for impedance matching). Antenna 40 may also be adjusted by controlling components such as adjustable components 120, 122, 124, and 126 (as examples).

Figure 14:
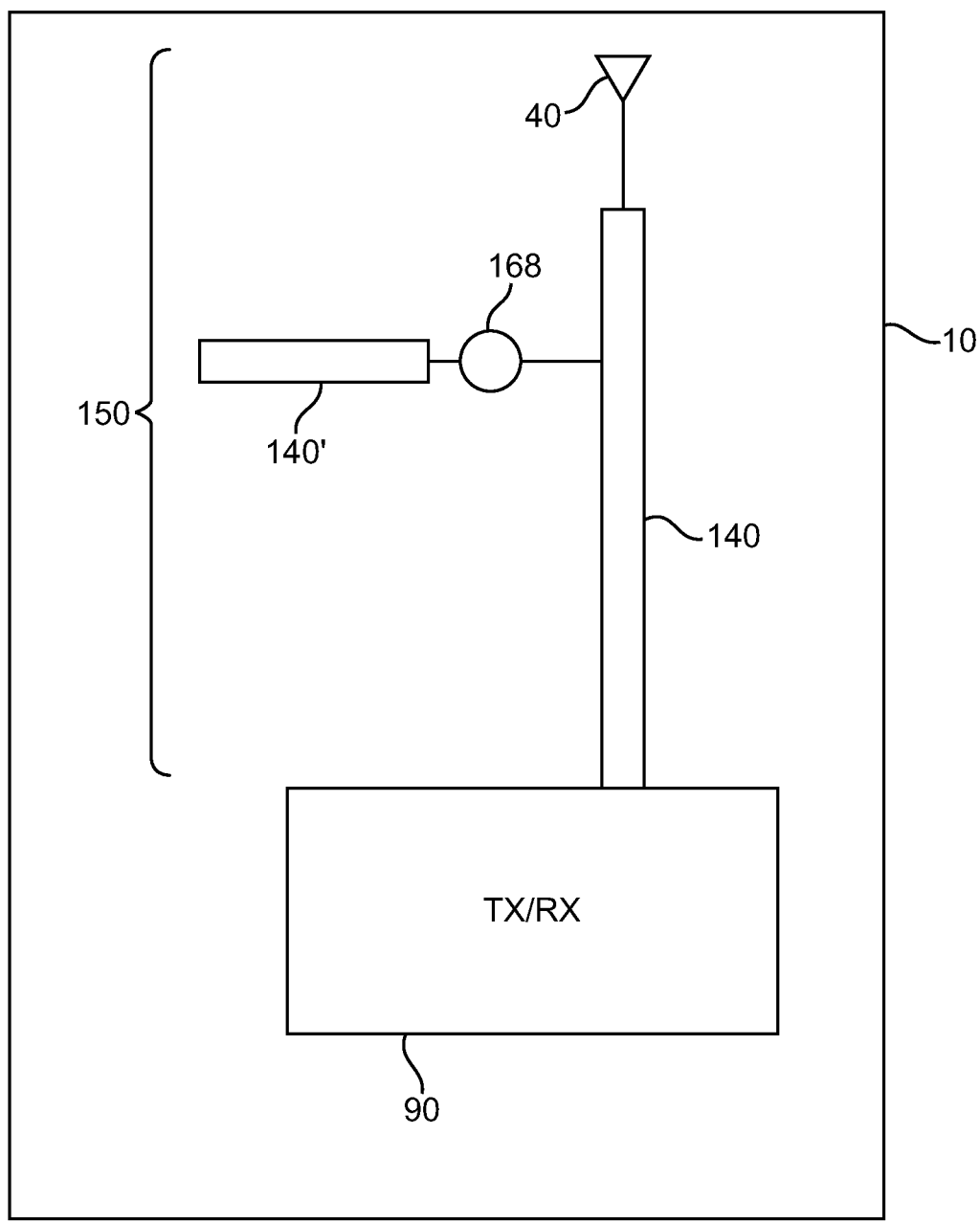
FIG. 14 is a diagram of an adjustable antenna system in an electronic device showing how the antenna system may be adjusted by adjusting transmission line loading in accordance with an embodiment of the present invention.

The adjustable components of FIG. 13 are sometimes depicted as adjustable electronic component 168 in the other drawings. FIG. 14 shows how adjustable antenna system 150 may include an adjustable transmission line. Adjustable transmission line 140 may include one or more adjustable electronic components such as adjustable electronic component 168. Adjustable electronic component 168 may be used to selectively adjust the properties of transmission line 140. For example, component 168 may be used to connect transmission line stub 140' to a main transmission line path in transmission line 140 and may be used to disconnect transmission line stub 140' from the main transmission line path in transmission line 140. By adjusting the properties of transmission line 140, the frequency response of the antenna (i.e., adjustable antenna system 150) can be controlled as described in connection with FIGS. 4 and 5 (as examples).

Figure 15:
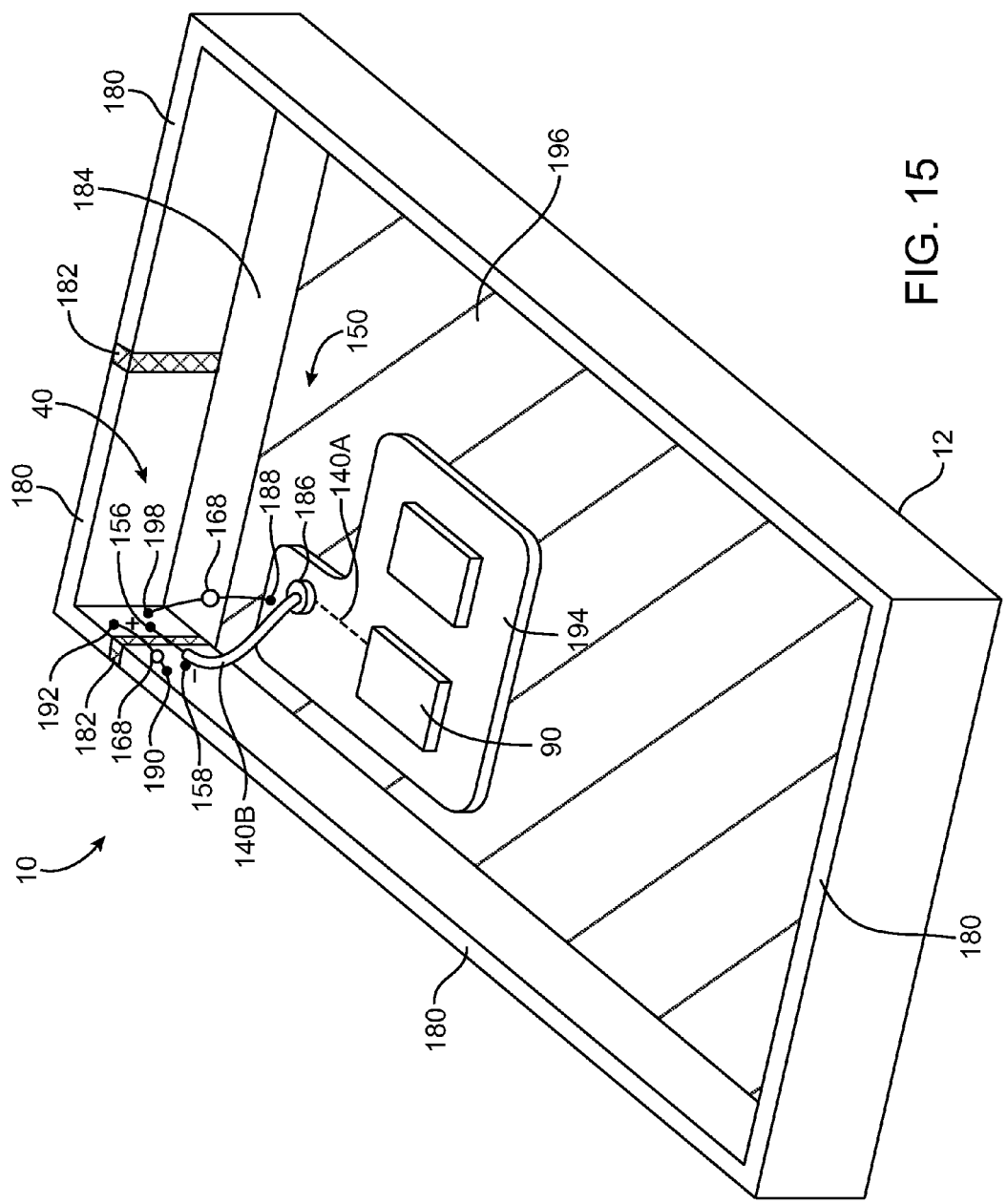
FIG. 15 is an interior perspective view of an illustrative electronic device having a peripheral conductive member and an internal planar conductive member showing how an adjustable electrical component may bridge gaps in the peripheral conductive member in accordance with an embodiment of the present invention.

FIG. 15 is an interior perspective view of electronic device 10 of FIG. 1 showing how electronic device 10 may include conductive structures such as conductive peripheral member 180. Device 10 may have a rectangular outline (periphery) when viewed from the front (i.e., when viewed from the face of device 10 that contains display 14). Conductive peripheral member 180 may be implemented using metal or other conductive materials. Conductive peripheral member 180 may surround substantially all of the rectangular periphery of device 10. Conductive peripheral member 180 may have the shape of a display bezel for display 14 or a trim structure for device 10 (i.e., a bezel or trim piece that runs around the upper rim on the front of device 10) or may be implemented using a flat or curved member that forms housing sidewalls that cover substantially all of the sides of housing 12 (as examples). A gap or multiple gaps such as gaps 182 may be interposed in conductive peripheral member 180. Gaps 182 may be formed from dielectric (e.g., air, plastic, glass, ceramics, composites, other dielectrics, or combinations of these materials). Gaps 182 may form part of the antennas in device 10 (e.g., antenna 40).

Transceiver 90 may be implemented using components such as one or more integrated circuits and other electrical components that are mounted on a substrate such as printed circuit board 194. Transmission line traces in board 194 (i.e., transmission line 140A may be coupled between transceiver 90 and radio-frequency connector 186. Connector 186 may be connected to a coaxial cable segment or other transmission line 104B. Transmission line 104B may be coupled to a matching network (e.g., matching network 152 of FIG. 13) and an antenna feed (e.g., an antenna feed made up of antenna feed terminals 158 and 156). The antenna feed may, for example, be coupled across one of gaps 182 or may be located elsewhere in device 10.

Adjustable electrical components 168 may be included in antenna 40 to help provide adjustable antenna system 150 with adjustability. As an example, an adjustable electrical component may bridge one of gaps 182 (e.g., by connecting one of components 168 between terminals 190 and 192 on opposing sides of a gap in peripheral conductive member 180). Adjustable electrical components 168 may also be connected between the other conductive components in adjustable antenna system 150 (e.g., between a first terminal such as terminal 198 that is attached to peripheral conductive member 180 and a second terminal such as terminal 188 that is connected to a conductive trace in board 194 (e.g., a ground plane trace).

Devices such as device 10 of FIG. 15 may, if desired, have planar members such as illustrative planar structure 196. Structure 196 may form part of the rear housing surface (i.e., an external housing wall structure on the rear face of housing 12) or may form an internal planar member (e.g., an internal housing structure that spans the width of device 10 while creating closed or open slot-shaped openings such as dielectric-filled opening 184 at one or both ends of device 10 as shown in FIG. 15). Structure 196 may be formed from metal (e.g., a metal plate) or other conductive structures and may, if desired, be used in forming an antenna ground plane for antenna 40.

Figure 16:
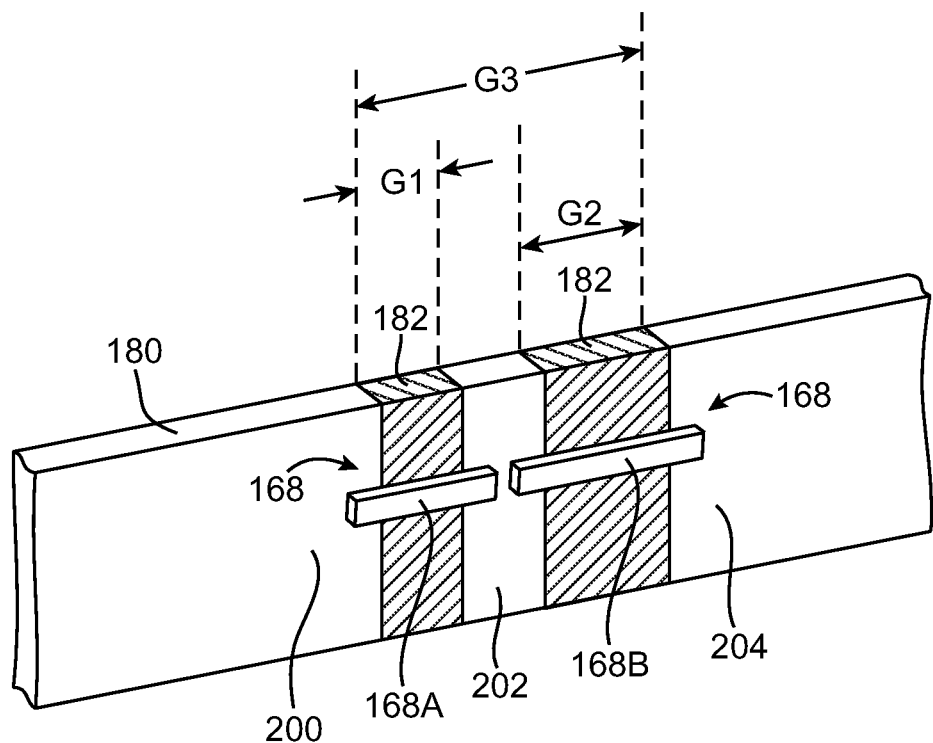
FIG. 16 is a perspective view of an interior portion of a peripheral conductive electronic device housing member showing how adjustable electrical components may be bridge gaps in the peripheral conductive member in accordance with an embodiment of the present invention.

Adjustable electrical components 168 may be used to provide adjustability to the size of gaps 182 in conductive peripheral member 180. Consider, as an example, the illustrative arrangement shown in FIG. 16. As shown in FIG. 16, a peripheral conductive member in device 10 such as peripheral conductive member 180 may have multiple adjacent gaps 182. In the FIG. 16 example, peripheral conductive housing member 180 has two gaps 182 a first of which has a length (width) of G1 and a second of which has a length (width) of G2. Adjustable electrical components 168A and 168B may bridge gaps 182 (e.g., on the interior side of peripheral conductive member 180). For example, adjustable electrical component 168A may have a first terminal that is electrically connected to portion 200 of peripheral conductive member 180 and a second terminal that is electrically connected to portion 202 of peripheral conductive member 180. Adjustable electrical component 168B may have a first terminal that is electrically connected to portion 202 of peripheral conductive member 180 and a second terminal that is electrically connected to portion 204 of peripheral conductive member 180. As with the other adjustable electrical components 168 for device 10, adjustable electrical components 168 of FIG. 16 may be implemented using switches, continuously or semicontinuously variable components such as variable capacitors, variable resistors, and variable inductors, continuously or semicontinuously adjustable circuit networks, etc.

Configurations of the type shown in FIG. 16 may be used to adjust the electrical properties of gaps 182 and/or to adjust effective gap length (i.e., to electrically adjust gap width). As shown in FIG. 16, for example, there may be a gap length (width) G3 between the outermost (most distant) edges of gaps 182. Adjustable components 168 may be, for example, switches. In this type of configuration, switch 168A may be opened to switch the leftmost gap 182 into use or may be closed to bypass the leftmost gap. Switch 168B may be opened to switch the rightmost gap 182 into use or may be closed to bypass the rightmost gap. When both switches 168A and 168B are open, antenna 40 has two gaps (of widths G1 and G2) connected in series within peripheral conductive member 180, so the gaps may be considered to have an effective width of G3. When switch 168A is closed and switch 168B is open, only the gap of width G2 is present. When switch 168B is closed and switch 168A is open, only the gap of width G1 is present. When both switches 168 are closed, no gap is present. Adjustment of the states of switches 168A and 168B (e.g., by applying control signals from storage and processing circuitry 28 to switches 168) can therefore adjust the width of the gap in conductive peripheral member 180. When adjustable electrical components other than switches are used (e.g., variable capacitors, inductors, etc.) a combination of impedance adjustments and effective gap width adjustments may be produced.

In the example of FIG. 16, adjustable electrical components 168 connect different portions of peripheral conductive member 180 to each other. Adjustable electrical components 168 may also be used to connect other conductive portions of antenna system 150 together such as other conductive portions of housing 12. As an example, adjustable components 168 and may be used to couple together different portions of a planar structure such as structure 196 of FIG. 17. Structure 196 may be formed using all or some of a rear housing structure (e.g., a housing wall), an internal housing member, or other conductive structures.

Figure 17:
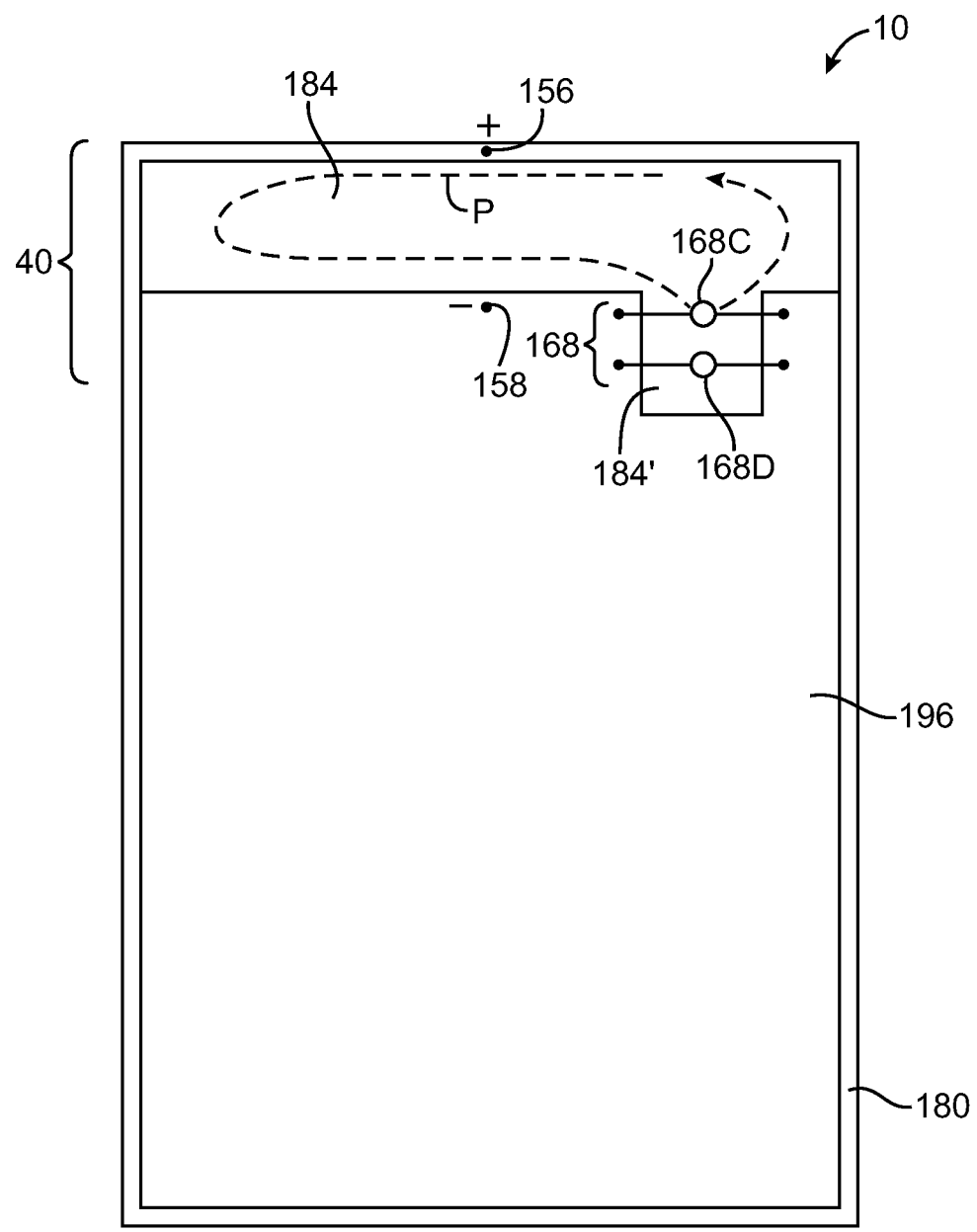
FIG. 17 is a top view of an electronic device showing how an adjustable electrical component may be used to connect different parts of an internal planar conductive member in accordance with an embodiment of the present invention.

Member 196 may, for example, have an opening such as opening 184' of FIG. 17. Opening 184' may be contiguous with opening 184 and may form an extension of opening 184. Opening 184 (and extension 184') may form an opening for antenna 40 (e.g., an opening for a slot antenna, a loop antenna, a hybrid antenna, etc.).

Opening 184 may have an inner periphery P. The length of inner periphery P and other electrical properties of antenna 40 may be adjusted by adjusting electrical components 168. For example, by using switches for components 168, the size of opening 184' and therefore the length of P may be adjusted. If switch 168C and 168D are both open, the size of extension 184' and length P will be maximized. If switch 168C is open and switch 168D is closed, the size of opening 184' will be halved (as an example). Switch 168C (and, if desired switch 168D) may be closed to reduce the size of opening 184' further (or even to bypass opening 184' entirely). Antenna 40 may exhibit a resonance peak when P is equal to about one wavelength of the radio-frequency antenna signals being handled by antenna 40. By adjusting P, the frequency response of antenna 40 can therefore be adjusted as described in connection with FIGS. 4 and 5 (i.e., by adjusting the center frequency of a slot antenna or loop antenna, etc.).

Figure 18:
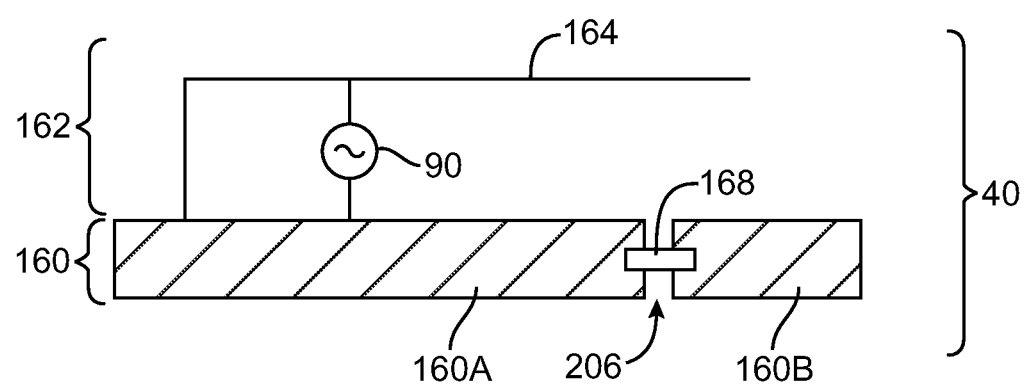
FIG. 18 is a diagram of an illustrative antenna in which an adjustable electrical component has been used to couple different parts of an antenna ground plane element in accordance with an embodiment of the present invention.

FIG. 18 shows how antenna 40 in adjustable antenna system 150 may be adjusted by providing one or more adjustable electrical components 168 between respective portions of ground plane 160. In the FIG. 18 example, ground plane 160 includes ground plane portion 160A and ground plane portion 160B. Adjustable electrical component 168 bridges gap 206 between portions 160A and 160B. By controlling adjustable electrical component 168, ground plane 160 can be altered (e.g., to include member 160A while member 160B is disconnected from antenna 40) or to include both members 160A and 160B (i.e., by coupling members 160A and 160B together by bridging gap 206. Component 168 may, for example, be a switch that can be opened to disconnect portion 160B from portion 160A and that can be closed to connect portions 160A and 160B together. Component 168 may also be an adjustable component such as an adjustable capacitor, adjustable resistor, adjustable inductor, or other adjustable circuitry that can be adjusted to tune antenna 40.

Figure 19:
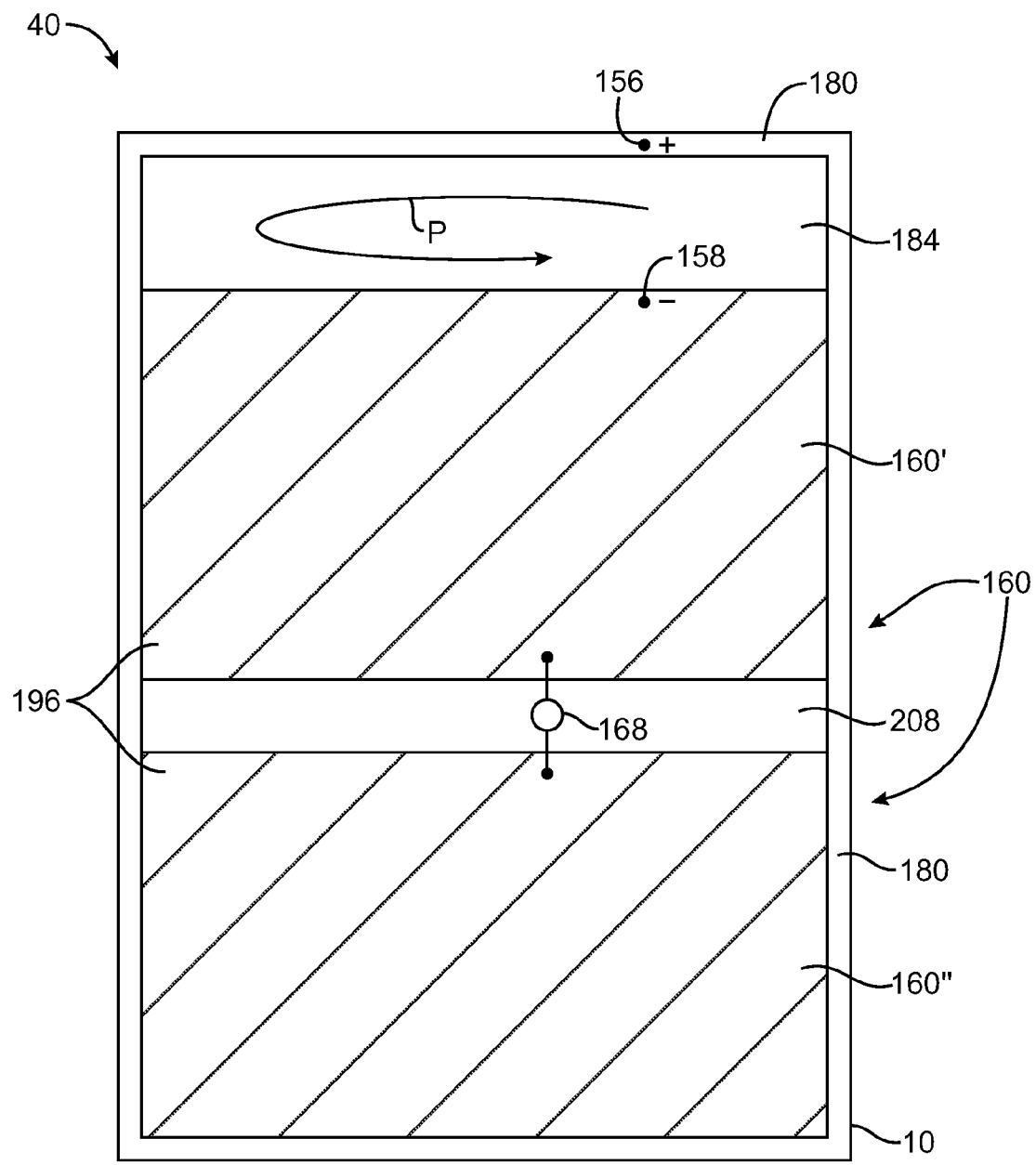
FIG. 19 is a diagram of an illustrative electronic device having a conductive peripheral housing member and an internal planar structure with multiple regions that have been coupled using an adjustable electrical component in accordance with an embodiment of the present invention.

If desired, ground plane 160 may be implemented using a planar structure such as planar structure 196 of FIG. 19. Structure 196 may be, for example, an external housing structure (e.g., a planar rear housing wall in housing 12), an internal housing structure (e.g., an internal plate or other planer support structure), or other conductive structures. Structure 196 may have a dielectric gap such as gap 208 that separates portions 160' and 160" of structure 196. Gap 208 may be bridged using adjustable electronic component 168 (e.g., a switch, a continuously adjustable component, etc.), thereby tuning the performance of antenna 40.

Figure 20:
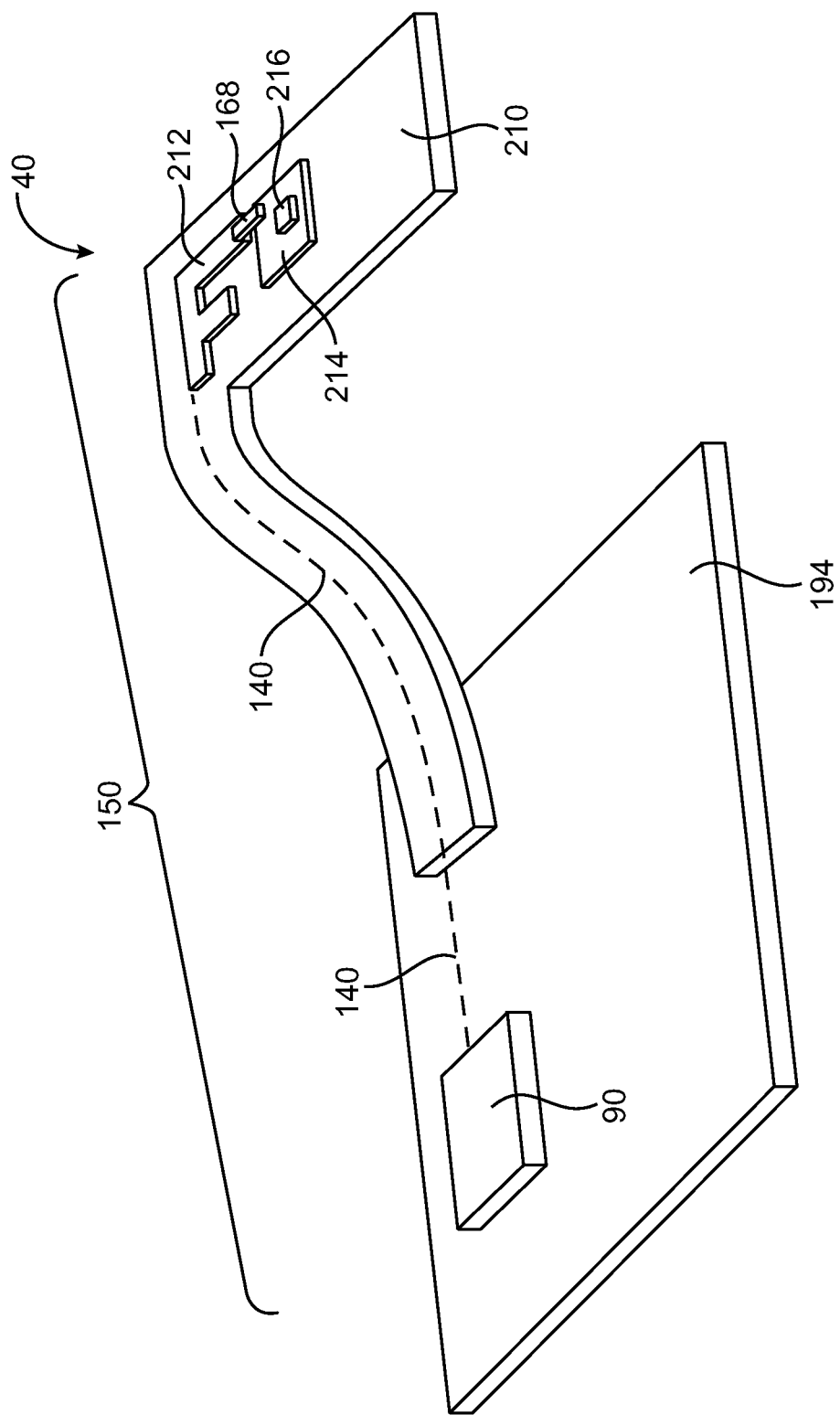
FIG. 20 is a perspective view of an illustrative radio-frequency transceiver circuit that has been mounted to a rigid printed circuit board and that has been coupled to a flex circuit on which conductive antenna structures are coupled to conductive flex traces and an optional flex-mounted component by an adjustable electrical component in accordance with an embodiment of the present invention.

As shown in FIG. 20, transceiver 90 may be mounted on a substrate such as a printed circuit board and coupled to an antenna 40 on a flex circuit substrate (substrate 210) via transmission line 140. Transmission line 140 may, for example, include conductive traces in printed circuit board 194 and conductive traces in flex circuit 210. Flex circuit 210 may be formed from a sheet of polyimide or other flexible polymer sheet that serves as a printed circuit board. Conductive traces for antenna 40 (e.g., conductive metal antenna resonating element traces such as traces 212 and 214) may be formed on the exposed outer surface of flex circuit substrate 210 or may be formed from internal conductive traces.

Adjustable electrical component 168 may bridge conductive antenna structures such as structures 212 and 214. Component 168 may be, for example, a switch that can be opened to disconnect structure 214 from structure 212 or that can be closed to connect structures 214 and 212. Structures 212 and 214 may form part of a ground plane element, part of antenna resonating element 162 (e.g., an arm such as arm 130 of FIG. 13), part of a parasitic element (e.g., an antenna element whose presence affects the frequency response of antenna system 150, but that is near-field coupled to the antenna rather than being directly fed by transmission line 140), etc. If desired, flex circuit 210 may be used as a substrate for one or more electrical components such as component 216. Components such as component 216 may be, for example, camera modules, speaker parts, button structures, integrated circuits, connectors, or other components (e.g., components that include conductive structures that may be connected to trace 214). These components may be mounted to flex circuit substrate 210 using parts of conductive traces 212 and 214 or using separate conductive traces.

Consider, as an example, an arrangement in which electronic device 10 includes a camera module. The camera module (e.g., one of input-output devices 32 of FIG. 2) may be mounted to flex circuit 210. Traces in flex circuit 210 may be used to provide power and control signals to the camera module and may be used to gather data signals from the camera module. Traces 214 and 212 may be formed on the same flex circuit as the camera module, reducing component count and saving space in device 10. Adjustable electrical component 168 may be adjusted to selectively switch into use conductive material on flex circuit 210 (e.g., traces such as traces 214 on flex circuit 210, conductive components associated with the camera module, conductive ground structures, etc.). In this way, adjustments to adjustable electrical component 168 may be used to tune antenna 40 and adjustable antenna system 150.

Figure 21:
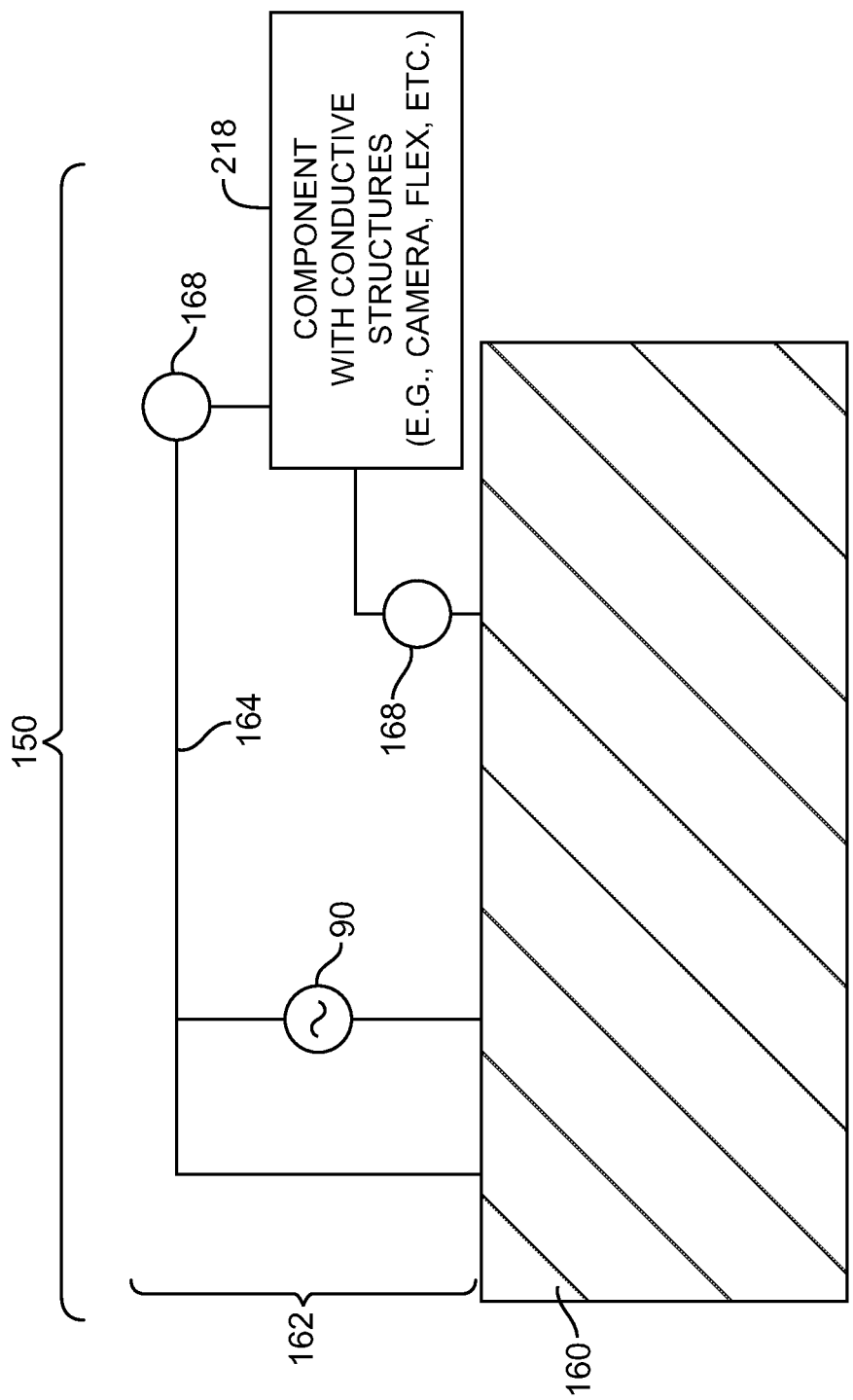
FIG. 21 is a diagram of an adjustable antenna system in which a component with conductive structures such as a flex circuit on which a camera or other device structure has been mounted may be coupled to portions of an antenna using adjustable electrical components in accordance with an embodiment of the present invention.

FIG. 21 is a diagram of adjustable antenna system 150 showing how a component such as component 218 may be coupled to antenna structures such as antenna resonating element 164 and antenna ground 160 using one or more adjustable electrical components 168. Component 218 may be, for example, a camera module (e.g., a camera module component on a flex circuit as described in connection with component 216 on flex circuit 210 of FIG. 20), a speaker, a button, a microphone, an input-output connector such as an audio jack or data connector, etc. One or both of the adjustable electrical components may be used in controlling adjustable antenna system 150. If desired, adjustable electrical components 168 may be used to selectively couple component 218 to other adjustable antenna system structures (e.g., transmission line structures, matching circuit structures, feed structures, etc.).

Figure 22:
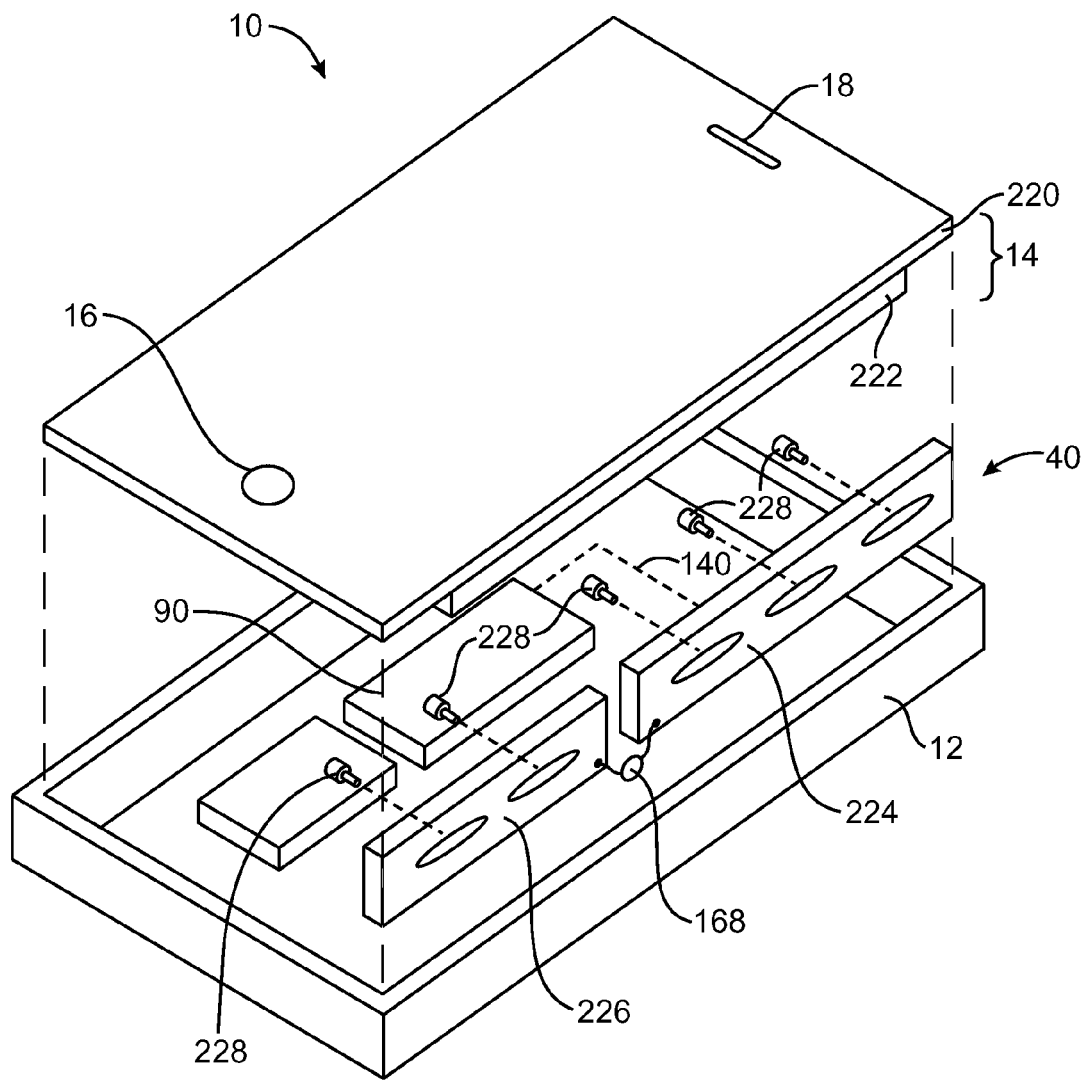
FIG. 22 is an exploded perspective view of an illustrative electronic device having components such as a radio-frequency transceiver circuit that uses an adjustable antenna system that includes conductive frame members and an adjustable electrical component in accordance with an embodiment of the present invention.

FIG. 22 is a perspective view of an illustrative configuration that may be used for electronic device 10. As shown in FIG. 22, electronic device 10 may have a display such as display 14. Display 14 may include a display module 222 mounted beneath a transparent cover layer such as cover glass layer 220. Components such as transceiver 90 may be mounted within the interior of housing 12. Antenna 40 may include conductive structures such as frame members 224 and 226. Antenna 40 may also include conductive structures such as antenna resonating element structures (e.g., conductive traces on a flex circuit, etc.), conductive structures such as ground plane elements (e.g., a ground plane formed from conductive plate 196 of FIG. 15 and overlapping conductive structures such as printed circuit boards, connectors, buttons, speakers, batteries, etc.), and other conductive structures.

In the FIG. 22 example, frame members 224 and 226 are mounted to housing 12 using fasteners such as screws 228. If desired, other attachment mechanisms may be used to attach frame members within housing 12 (e.g., welds, adhesive, springs, engagement features such as protrusions and mating slots, etc.). Frame members 224 and 226 may be formed from metal or other conductive materials. Adjustable electrical component 168 may be used to control how many frame members such as members 224 and 226 are electrically connected within antenna 40 (e.g., to control the size of an antenna resonating element arm or ground plane) or may be used to control other electrical antenna properties. This allows adjustable antenna system 150 to be tuned as described in connection with FIGS. 4 and 5.

Figure 23:
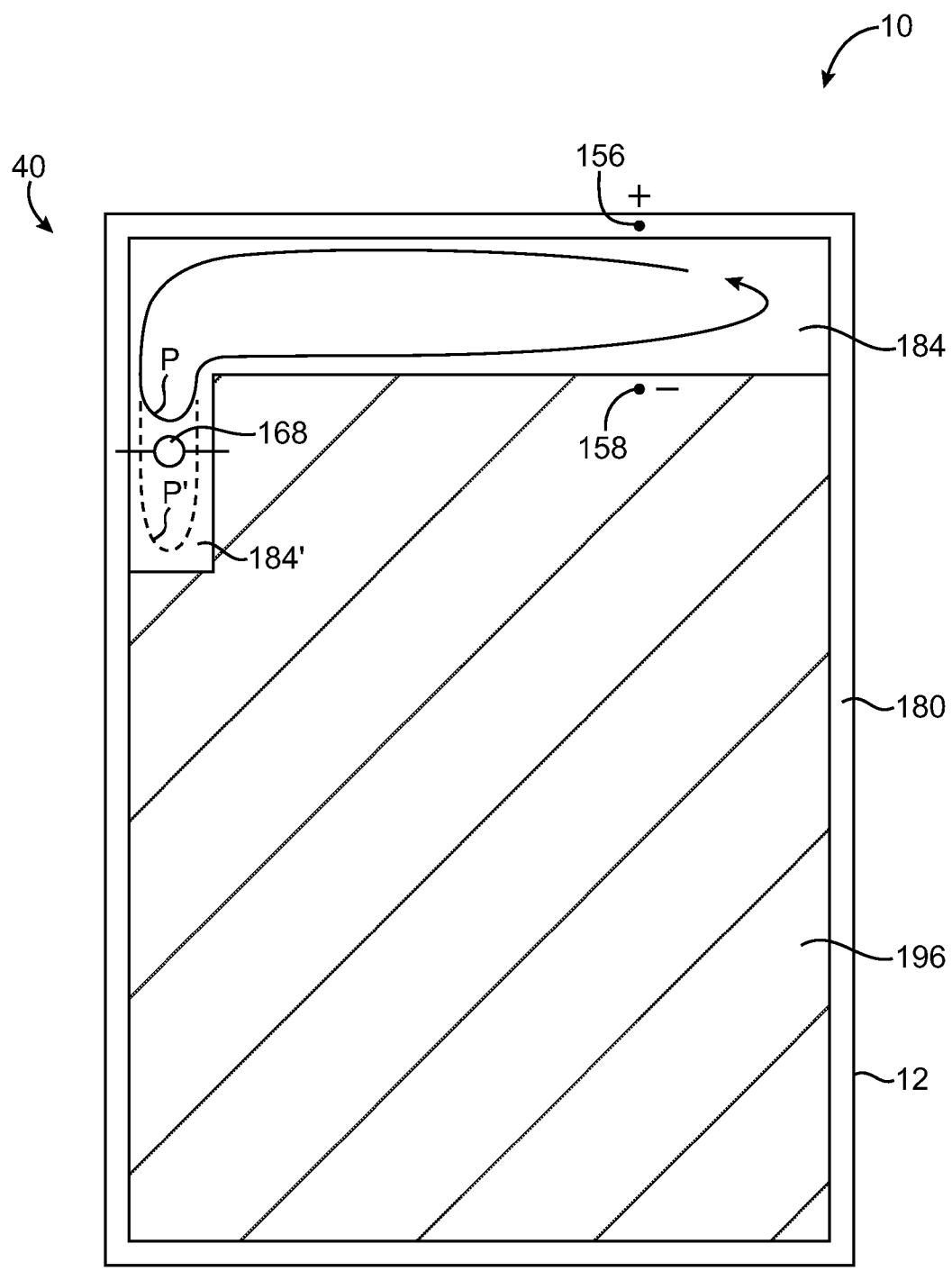
FIG. 23 is a top view of an illustrative electronic device showing how an adjustable antenna system may be formed using an adjustable electrical component that couples a conductive peripheral housing member to a conductive planar internal housing member in accordance with an embodiment of the present invention.

FIG. 23 shows how one or more adjustable electronic components such as adjustable electronic component 168 may be coupled between a ground plane element such as plate member 196 and a portion of peripheral conductive member 180 (e.g., a peripheral housing sidewall or bezel structure). Adjustable component 168 of FIG. 23 may be, for example, a switch that can be placed in an open or closed position. Portions of peripheral conductive member 180 and opposing portions of conductive structure 196 may define an opening such as opening 184 with an inner periphery. Component 168 may bridge opening extension 184'. Opening 184 (including extension 184') may form a slot for a slot antenna or hybrid antenna. The length of the inner periphery of opening 184 may be approximately equal to one wavelength at an operating frequency of interest. Switch 168 may be closed to decrease the length of the inner periphery (to length P) or can be opened to increase the length of the inner periphery (to length P'). Adjustments to component 168 may therefore be used to control the frequency response of antenna 40.

The antenna system adjustment mechanisms described in connection with FIGS. 1-23 may, if desired, be used in any combination. For example, antenna system adjustments may be made using any combination of transmission line adjustments, matching network adjustments, antenna adjustments, antenna feed adjustments, antenna resonating element adjustments, antenna ground adjustments, etc. Adjustable electrical components 168 may be incorporated into any combination of the portions of antenna system 150 (e.g., to bridge ground gaps, to bridge portions of an antenna resonating element, to connect a ground plate to a peripheral conductive member in a device housing, to connect portions of a peripheral housing member together in various formations and thereby adjust the width of a dielectric gap in the peripheral housing member, to form connections between conductive antenna structures and housing frame members, to bridge any combination of these structures, etc.).

Figure 24:
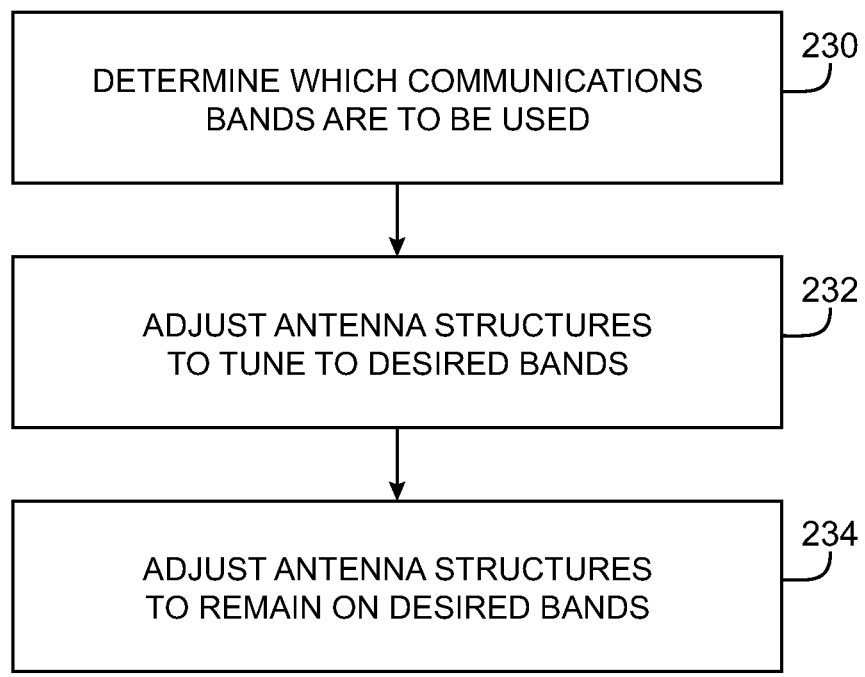
FIG. 24 is a flow chart of illustrative steps involved in operating an electronic device with an adjustable antenna system in accordance with an embodiment of the present invention.

FIG. 24 is a flow chart of illustrative steps involved in operating an electronic device with an adjustable antenna system such as electronic device 10 of FIG. 1.

At step 230, storage and processing circuitry 28 (FIG. 2) may be used to determine which communications bands are to be used by device 10. For example, if signals are being transmitted over a 2.4 GHz local WiFi link, storage and processing circuitry 28 may conclude that adjustable antenna system 150 will be covering (or should continue to cover) the 2.4 GHz communications band. Wireless communications in various cellular telephone bands may also be supported. The operations of step 230 may involve determination of the capabilities of device 10 (i.e., the capabilities of transceiver 90), the current geographic location of device 10 (e.g., the current country in which device 10 is located), current traffic being handled (e.g., determining what type of cellular traffic or local area network traffic is currently being received on a particular band), etc. Information on currently active bands or bands that need to be covered to receive incoming data may be gathered by monitoring incoming traffic through a fixed antenna (e.g., in a system of the types shown in FIG. 3 in which some antennas are fixed and some are adjustable) or by periodically cycling an adjustable antenna system through all possible bands of interest. Information on bands that are to be used for an upcoming activity (e.g., a data transmission activity) may be determined based on factors such as the last band used, geographic location, trial and error, look-up tables mapping device activities to required band usage, etc.

At step 232, after having determined which communications bands are to be covered by adjustable antenna system 150, storage and processing circuitry 28 may, in response, issue corresponding control signals to adjustable antenna system 150. If, for example, storage and processing circuitry 28 determines that adjustable antenna system 150 should cover the 1900 MHz band, control signals may be issued to the adjustable electrical components 168 in adjustable antenna system 150 to configure adjustable antenna system 150 to cover the 1900 MHz band (as an example).

At step 234, the adjustable electrical component(s) 168 in adjustable antenna system 150 may be controlled by the control signals that have been issued, thereby tuning adjustable antenna system 150 coarsely (e.g., to cover a desired band as described in connection with FIG. 4) and/or finely (e.g., to improve tuning accuracy within a particular communications band as described in connection with FIG. 5).

The operations of FIG. 24 (e.g., monitoring to determine which bands are of interest, determining how to adjust components 168, and issuing commands that adjust components 168 and therefore system 150) may be performed repeatedly in real time (e.g., in response to the satisfaction of appropriate trigger criteria, periodically according to a schedule, continuously, etc.).

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device having a periphery and an exterior, comprising:
   a display;
   radio-frequency transceiver circuitry;
   an antenna having an antenna feed;
   a transmission line path coupled between the radio-frequency transceiver circuitry and the antenna feed;
   peripheral conductive housing structures that run along the periphery and surround the display, wherein the peripheral conductive housing structures extend along at least two external surfaces of the electronic device at the exterior of the electronic device, and the peripheral conductive housing structures include a portion that forms at least part of the antenna;
   storage and processing circuitry; and
   an adjustable electrical component that has at least one terminal that is electrically coupled to the peripheral conductive housing structures and that has a control terminal that receives control signals from the storage and processing circuitry that adjust frequency response in the antenna.

2. The electronic device defined in claim 1, wherein the peripheral conductive housing structures include a dielectric-filled gap at the exterior of the electronic device.

3. The electronic device defined in claim 2, wherein the peripheral conductive housing structures include an additional dielectric-filled gap at the exterior of the electronic device.

4. The electronic device defined in claim 3, wherein the dielectric-filled gap and the additional dielectric-filled gap are formed at different external surfaces of the electronic device.

5. The electronic device defined in claim 2, wherein the at least one terminal of the adjustable electrical component comprises first and second terminals coupled to the peripheral conductive housing structures at opposing sides of the dielectric-filled gap.

6. The electronic device defined in claim 1, wherein the adjustable electrical component comprises at least one of an adjustable capacitor and an adjustable inductor.

7. The electronic device defined in claim 1, wherein the antenna comprises an inverted-F antenna and the portion of the peripheral conductive housing structures that forms at least part of the antenna forms an antenna resonating element for the inverted-F antenna.

8. The electronic device defined in claim 1, wherein the electronic device has a length, a width that is less than the length, and a height that is less than the width, and the peripheral conductive housing structures extend across the height of the electronic device.

9. The electronic device defined in claim 8, wherein the peripheral conductive housing structures extend across the length and the width of the electronic device.

10. The electronic device defined in claim 8, wherein the antenna feed comprises a signal feed terminal coupled to the portion of the peripheral conductive housing structures.

11. An electronic device having a periphery, comprising:
    ground plane structures;
    peripheral conductive housing structures that run along the periphery of the electronic device and surround the ground plane structures;
    an antenna formed from at least a portion of the peripheral conductive housing structures and a portion of the ground plane structures, wherein a signal feed terminal for the antenna is coupled to the portion of the peripheral conductive housing structures and the portion of the peripheral conductive housing structures is separated from the ground plane structures by a dielectric-filled opening;
    an adjustable electronic component that bridges the dielectric-filled opening; and storage and processing circuitry that provides control signals to a control input of the adjustable electronic component to tune a frequency response of the antenna.

12. The electronic device defined in claim 11, wherein the adjustable electronic component comprises a first terminal coupled to the portion of the peripheral conductive housing structures and a second terminal coupled to the portion of the ground plane structures.

13. The electronic device defined in claim 11, wherein the adjustable electronic component comprises an inductor connected in series with a switch between the portion of the peripheral conductive housing structures and the portion of the ground plane structures.

14. The electronic device defined in claim 11, wherein the electronic device has an exterior and the peripheral conductive housing structures extend along at least two external surfaces of the electronic device at the exterior of the electronic device.

15. The electronic device defined in claim 11, wherein the electronic device has a length, a width that is less than the length, and a height that is less than the width, and the ground plane structures and the dielectric-filled opening each substantially extends across the width of the electronic device.

16. The electronic device defined in claim 11, further comprising:
radio-frequency transceiver circuitry;
a transmission line path coupled between the radio-frequency transceiver circuitry and the signal feed terminal; and
impedance matching circuitry interposed on the transmission line path.

17. An electronic device having a periphery, a length, a width that is less than the length, and a height that is less than the width, comprising:
a ground plane that extends across the width of the device;
peripheral conductive housing structures that run along the periphery of the electronic device and surround the ground plane;
an antenna formed from at least a portion of the peripheral conductive housing structures and a portion of the ground plane;
a dielectric-filled opening between the portion of the peripheral conductive housing structures and the ground plane, wherein the dielectric-filled opening comprises a first portion having a first longitudinal axis that extends across the width of the electronic device and a second portion having a second longitudinal axis that extends parallel to the length of the electronic device;
an adjustable electronic component coupled across the second portion of the dielectric-filled opening that is configured to tune a resonant frequency of the antenna; and
storage and processing circuitry that provides control signals to a control terminal of the adjustable electronic component to tune the resonant frequency of the antenna.

18. The electronic device defined in claim 17, wherein the electronic device has an exterior, the peripheral conductive housing structures are formed at the exterior of the electronic device, and the peripheral conductive housing structures comprise first and second dielectric-filled gaps that extend across the height of the electronic device.

19. The electronic device defined in claim 17, further comprising:
radio-frequency transceiver circuitry;
a signal feed terminal for the antenna coupled to the portion of the peripheral conductive housing structures; and
a transmission line path coupled between the radio-frequency transceiver circuitry and the signal feed terminal.

* * * * *